US011030269B2

(12) United States Patent
Owens

(10) Patent No.: US 11,030,269 B2
(45) Date of Patent: Jun. 8, 2021

(54) ANALYTIC DATA COLLECTION FOR APPLICATION NAVIGATION

(71) Applicant: Apple Inc., Cupertino, CA (US)

(72) Inventor: Michael J. Owens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/263,704

(22) Filed: Jan. 31, 2019

(65) Prior Publication Data

US 2019/0370299 A1 Dec. 5, 2019

Related U.S. Application Data

(60) Provisional application No. 62/679,914, filed on Jun. 3, 2018.

(51) Int. Cl.
*G06F 16/00* (2019.01)
*G06F 16/954* (2019.01)
*G06F 16/9535* (2019.01)
*G06F 16/9538* (2019.01)
*G06F 16/951* (2019.01)

(52) U.S. Cl.
CPC .......... *G06F 16/954* (2019.01); *G06F 16/951* (2019.01); *G06F 16/9535* (2019.01); *G06F 16/9538* (2019.01)

(58) Field of Classification Search
CPC .............. G06F 16/954; G06F 16/9535; G06F 16/9538; G06F 16/951; G06Q 30/0631; G06Q 30/0201
See application file for complete search history.

(56) References Cited

U.S. PATENT DOCUMENTS

| | | | |
|---|---|---|---|
| 9,542,091 B2 * | 1/2017 | Missig | G06F 3/04842 |
| 2011/0173539 A1 * | 7/2011 | Rottler | G06F 3/0482 |
| | | | 715/727 |
| 2016/0360336 A1 * | 12/2016 | Gross | H04W 4/50 |
| 2017/0017483 A1 * | 1/2017 | Poon | G06F 11/302 |
| 2018/0335921 A1 * | 11/2018 | Karunamuni | G06F 3/0488 |

* cited by examiner

*Primary Examiner* — Diedra McQuitery
(74) *Attorney, Agent, or Firm* — Dickinson Wright RLLP

(57) ABSTRACT

Systems, methods, and computer-readable media for collecting analytic data for application navigation with an electronic device are provided. A navigation event operative to navigate away from the presentation of a particular type of application content of an application (e.g., a news article of a news aggregator application) or any other suitable analytic event may be carried out on an electronic device, in response to which the device may be operative to collect certain data for defining an analytics payload of data that may then be shared by the device for any suitable analysis, such as to analyze how a user arrived at that presented article, how long a user viewed the article, whether or how often a user played back any video embedded in the article, and/or the like, where such analysis may be used to more effectively recommend news articles to the user in the future.

20 Claims, 13 Drawing Sheets

ANALYTIC DATA COLLECTION FOR APPLICATION NAVIGATION

This application claims the benefit of prior filed U.S. Provisional Patent Application No. 62/679,914, filed Jun. 3, 2018, which is hereby incorporated by reference herein in its entirety.

TECHNICAL FIELD

This disclosure relates to collecting analytic data for application navigation with an electronic device.

BACKGROUND OF THE DISCLOSURE

Data indicative of user navigation within an application on an electronic device is collected for analytic purposes. Often, however, collection of such data is inefficient and unmanageable, especially for increasingly complex hierarchical application navigation.

SUMMARY OF THE DISCLOSURE

This document describes systems, methods, and computer-readable media for collecting analytic data for application navigation with an electronic device.

For example, a method for collecting analytic data for navigation of an application on an electronic device may be provided that includes, while presenting content of a view of a first module of an application using an output component of the electronic device, detecting a navigation event, in response to detecting the navigation event, presenting content of a view of a second module of the application using the output component, while presenting the content of the view of the second module of the application, detecting an analytic event that is associated with a plurality of analytic field data types, for an analytic field data type of the plurality of analytic field data types that matches an application field data type associated with a stack of the second module, obtaining a data object from the stack of the second module, for an other analytic field data type of the plurality of analytic field data types that does not match any application field data type associated with any stack of the second module but that matches an other application field data type associated with a stack of the first module, obtaining a data object from the stack of the first module, and defining an analytics payload for the detected analytic event using the data object obtained from the stack of the second module and using the data object obtained from the stack of the first module.

As another example, a method for collecting analytic data for navigation of an application on an electronic device may be provided that includes presenting at least a first portion of first content of a first view of a first module of the application using an output component of the electronic device, storing a first data object associated with a current state of the first content of the first view in a first stack of the first module, wherein a first application field data type is associated with the first stack, while the at least the first portion of the first content of the first view is being presented, detecting a first event with a first view controller of the first module, in response to detecting the first event, loading a second module of the application, wherein the second module includes router tracker data identifying the first module as a parent of the second module, after the loading, presenting at least a second portion of second content of a second view of the second module using the output component, storing a second data object associated with a current state of the second content of the second view in a second stack of the second module, wherein a second application field data type is associated with the second stack, while the at least the second portion of the second content of the second view is being presented, detecting a second event with a second view controller of the second module, and, in response to detecting the second event, determining an analytics payload for the detected second event, wherein determining the analytics payload for the detected second event includes identifying each of at least one analytic field data type associated with the detected second event, for each identified analytic field data type that matches an application field data type associated with a stack of the second module, obtaining at least one data object stored in that stack of the second module, when at least one data object has been obtained from the second module for each identified analytic field data type, defining the analytics payload to include each data object obtained from the second module, and, when at least one data object has not been obtained from the second module for each identified analytic field data type, identifying the first module as the parent of the second module using the router tracker data of the second module, for each identified analytic field data type that did not match an application field data type associated with any stack of the second module but that matches an application field data type associated with a stack of the identified first module, obtaining at least one data object stored in that stack of the identified first module, and, when at least one data object has been obtained from any one of the second module and the identified first module for each identified analytic field data type, defining the analytics payload to include each data object obtained from the second module and each data object obtained from the identified first module.

As yet another example, an electronic device may be provided that includes a communications component, a memory component, an input component, an output component, and a processor configured to operate an application by detecting a navigation event using the input component while presenting content of a view of a first module of the application using the output component, in response to detecting the navigation event, presenting content of a view of a second module of the application using the output component, while presenting the content of the view of the second module of the application, detecting, using the input component, an analytic event that is associated with a plurality of analytic field data types, for an analytic field data type of the plurality of analytic field data types that matches an application field data type associated with a stack of the second module, obtaining a data object from the stack of the second module, for an other analytic field data type of the plurality of analytic field data types that does not match any application field data type associated with any stack of the second module but that matches an other application field data type associated with a stack of the first module, obtaining a data object from the stack of the first module, defining an analytics payload for the detected analytic event using the data object obtained from the stack of the second module and using the data object obtained from the stack of the first module, and communicating the defined analytics payload to a remote server using the communications component.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Figure 1:
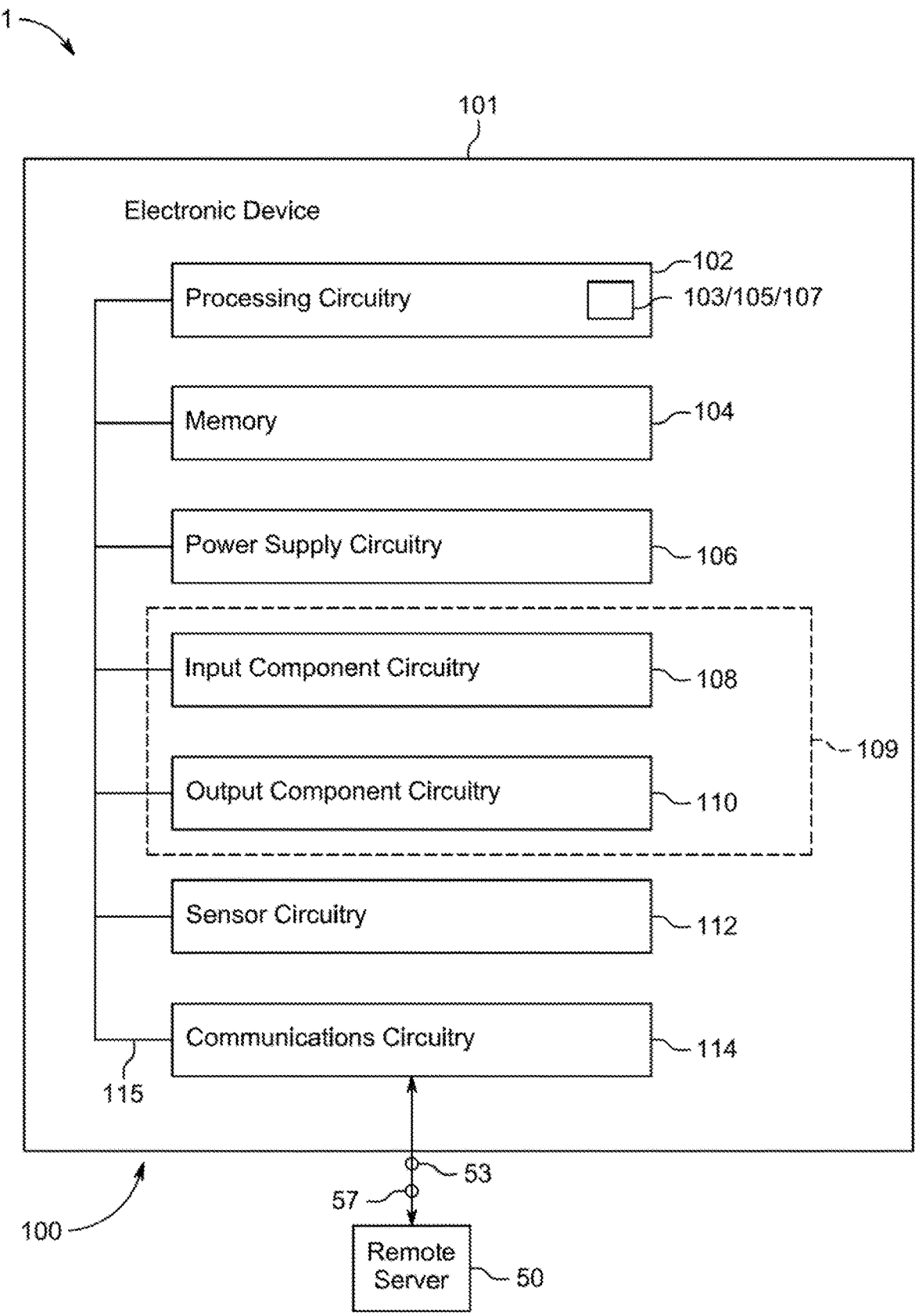
FIG. 1 is a schematic view of an illustrative system for collecting analytic data for application navigation.

Systems, methods, and computer-readable media may be provided to collect analytic data for application navigation. A navigation event operative to navigate away from the presentation of a particular type of application content of an application (e.g., a news article of a news aggregator application) on an electronic device may also be referred to herein as an analytic event, in response to which the device may be operative to collect certain data for defining an analytics payload of data that may then be shared by the device with any suitable entity to perform any suitable analysis on that data for any suitable purpose (e.g., to analyze how a user arrived at that presented article (e.g., directly from a high-level news recommendation feed or from a group-level news recommendation feed), how long a user viewed the article, whether or how often a user played back any video embedded in the article, and/or the like, where such analysis may be used to more effectively recommend news articles to the user in the future). Certain analytic data to be collected in response to a certain analytic event for defining such analytics payload data may not be originally captured particularly for the view at which the analytic event occurred. For example, when a particular analytic event may occur in response to the application navigating away from the presentation of a particular article, certain analytic data to be collected for defining the analytics payload data associated with that article may not be analytic data that was originally captured based on the presentation of that article (e.g., the duration of time in which a user viewed the presentation of the article). Instead, some analytic data that may be collected for defining the analytics payload data for the article may be originally captured when the application navigated from a high-level news recommendation feed to a group-level news recommendation feed (e.g., a group-level news recommendation feed from which the application then navigated to the article of the analytic event). Therefore, the application may be designed to capture and store analytic data in a particular manner such that the application may be able to collect the appropriate analytic data in an effective and efficient manner for defining analytics payload data. For example, analytic data for a particular view of content (e.g., a particular feed or a particular article) may be captured and stored in a particular module of that particular view, but that module may then be linked to another particular module of another particular view (e.g., a child view of another particular view from which the application navigated to the child view in response to a navigation event) in which other analytic data for that other particular view may be stored. Therefore, view-specific analytic data may be captured by and stored at a view-specific module but then linked to other view-specific analytic data that may be captured by and stored at another view-specific module (e.g., a child of the first view-specific module). Then, in response to a particular analytic event at a particular view-specific module, the application may be operative to collect only the necessary analytic data captured by one or more modules included in a navigational path associated with the view-specific module at which the particular analytic event was detected. Therefore, the data tracking may occur independently of the analytic event submission. This may significantly increase the flexibility and speed and efficiency and effectiveness of the application's ability to define analytics payload data for a particular analytic event. This may reduce the amount of data passed between modules and/or the amount of data stored in modules.

FIG. 1 is a schematic view of an illustrative system 1 that may include at least one of each one of an electronic device 100 and a remote server 50 for collecting analytic data for application navigation in accordance with some embodiments. Electronic device 100 can include, but is not limited to, a media player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, watch, biometric monitor, or any combination thereof. In some embodiments, electronic device 100 may perform a single function (e.g., a device dedicated to collecting analytic data for application navigation) and, in other embodiments, electronic device 100 may perform multiple functions (e.g., a device that collects application analytic data, plays music, and receives and transmits telephone calls). Electronic device 100 may be any portable, mobile, hand-held, or miniature electronic device that may be configured to collect analytic data for application navigation wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry 102, memory 104, power supply circuitry 106, input component circuitry 108, output component circuitry 110, sensor circuitry 112, and communications circuitry 114. Electronic device 100 may also include a bus 115 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, media information (e.g., media content and/or associated metadata), preference information (e.g., media playback preferences), lifestyle information (e.g., food preferences), exercise information (e.g., information obtained by exercise monitoring equipment or any suitable sensor circuitry), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), application navigation analytic information, any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply circuitry 106 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply circuitry 106 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 108 may be provided to permit a user to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, still image camera, video camera, scanner (e.g., a bar code scanner or any other suitable scanner that may obtain product identifying information from a code, such as a bar code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch (e.g., multi-touch) of a display screen and that may also provide visual information to a user via that same display screen.

Sensor circuitry 112 may include any suitable sensor or any suitable combination of sensors operative to detect movements of electronic device 100 and/or any other characteristics of device 100 or its environment (e.g., physical activity or other characteristics of a user of device 100). For example, sensor circuitry 112 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor circuitry 112 may include one or more single-axis or two-axis acceleration motion sensors that may be operative to detect linear acceleration only along each of the x- or left/right direction and the y- or up/down direction, or along any other pair of directions. In some embodiments, sensor circuitry 112 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). In some embodiments, sensor circuitry 112 may be operative to directly or indirectly detect rotation, rotational movement, angular displacement, tilt, position, orientation, motion along a non-linear (e.g., arcuate) path, or any other non-linear motions. Additionally or alternatively, sensor circuitry 112 may include one or more angular rate, inertial, and/or gyro-motion sensors or gyroscopes for detecting rotational movement. For example, sensor circuitry 112 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor circuitry 112 for detecting motion on device 100, such as any suitable pressure sensors, altimeters, or the like. Using sensor circuitry 112, electronic device 100 may be configured to determine a velocity, acceleration, orientation, and/or any other suitable motion attribute of electronic device 100.

Sensor circuitry 112 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. In some examples, a biometric sensor may include, but is not limited to, one or more health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, device 100 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of device 100 can be used to determine a user's location and movement, as well as a displacement of the user's motion. An accelerometer, directional sensor, and/or gyroscope can further generate activity data that can be used to determine whether a user of device 100 is engaging in an activity, is inactive, or is performing a gesture. Device 100 can further include a timer that can be used, for example, to add time dimensions to various attributes of the detected physical activity, such as a duration of a user's physical activity or inactivity, time(s) of a day when the activity is detected or not detected, and/or the like. One or more sensors of sensor circuitry or component 112 may be embedded in a body (e.g., housing 101) of device 100, such as along a bottom surface that may be operative to contact a user, or can be positioned at any other desirable location. In some examples, different sensors can be placed in different locations inside or on the surfaces of device 100 (e.g., some located inside housing 101) and some attached to an attachment mechanism (e.g., a wrist band coupled to a housing of a wearable device), or the like. In other examples, one or more sensors can be worn by a user separately from device 100. In such cases, the sensors can be configured to communicate with device 100 using a wired and/or wireless technology (e.g., via communications circuitry 114). In some examples, sensors can be configured to communicate with each other and/or share data collected from one or more sensors. In some other examples, device 100 can be waterproof such that the sensors can detect a user's activity in water.

Communications circuitry 114 may be provided to allow device 100 to communicate with one or more other electronic devices or servers using any suitable communications protocol. For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multiband, etc.), any communications protocol that may be used by a low power Wireless Personal Area Network ("6LoWPAN") module, Near Field Communication ("NFC"), any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

Processing circuitry 102 of electronic device 100 may include any processing circuitry that may be operative to control the operations and performance of one or more components of electronic device 100. For example, processor 102 may receive input signals from any input component 108 and/or sensor circuitry 112 and/or communications circuitry 114 and/or drive output signals through any output component 110 and/or communications circuitry 114. As shown in FIG. 1, processor 102 may be used to run at least one application 103. Application 103 may include, but is not limited to, one or more operating system applications, firmware applications, software applications, algorithmic modules, media analysis applications, media playback applications, media editing applications, communications applications, pass applications, calendar applications, social media applications, state determination applications, biometric feature-processing applications, activity monitoring applications, activity motivating applications, news applications, stock applications, book applications, and/or any other suitable applications. For example, processor 102 may load application 103 as a user interface program to determine how instructions or data received via an input component 108 and/or any other component of device 100 may manipulate the one or more ways in which information may be stored and/or provided to the user via an output component 110 and/or any other component of device 100. Any application 103 may be accessed by any processing circuitry 102 from any suitable source, such as from memory 104 (e.g., via bus 115) and/or from another device or server (e.g., remote server 50) (e.g., via communications circuitry 114). Processor 102 may include a single processor or multiple processors. For example, processor 102 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Processor 102 also may include on board memory for caching purposes. Server 50, although not shown, may be configured to include, one, some, each, and/or multiple ones of the components of device 100 (e.g., processing circuitry, memory, power supply circuitry, input component circuitry, output component circuitry, sensor circuitry, and/or communications circuitry). Server 50 can be configured to communicate with a plurality of devices 100, and store data collected from these devices, and/or share data with the devices. Server 50 can be further configured to execute computer instructions on any suitable data and communicate the result with one or more of these devices 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Figure 2:
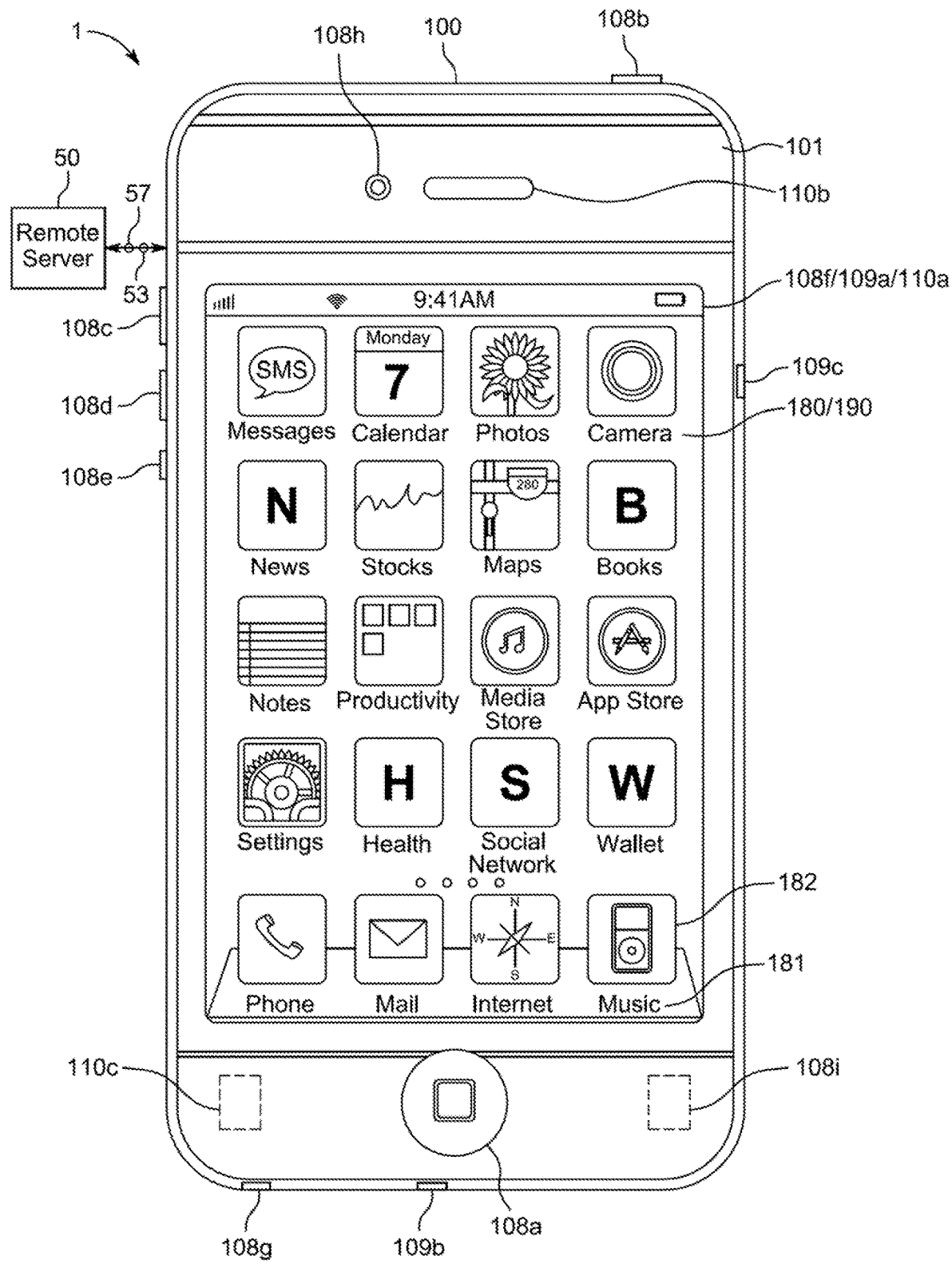
FIG. 2 is a front view of an illustrative example of an electronic device in the system of FIG. 1.

As shown in FIG. 2, one specific example of electronic device 100 may be an electronic device, such as an iPhone™, where housing 101 may allow access to various input components 108a-108i, various output components 110a-110c, and various I/O components 109a-109c through which device 100 and a user and/or an ambient environment may interface with each other. Input component 108a may include a button that, when pressed, may cause a "home" screen or menu of a currently running application to be displayed by device 100. Input component 108b may be a button for toggling electronic device 100 between a sleep mode and a wake mode or between any other suitable modes. Input component 108c may include a two-position slider that may disable one or more output components 112 or any other feature(s) in certain modes of electronic device 100. Input components 108d and 108e may include buttons for increasing and decreasing the volume output or any other characteristic output of an output component 110 or any other feature(s) of electronic device 100. Each one of input components 108a-108e may be a mechanical input component, such as a button supported by a dome switch, a sliding switch, a control pad, a key, a knob, a scroll wheel, or any other suitable form.

An output component 110a may be a display that can be used to display a visual or graphic user interface ("GUI")

180, which may allow a user to interact with electronic device 100. GUI 180 may include various layers, windows, screens, templates, elements, menus, and/or other components of a currently running application (e.g., application 103) that may be displayed in all or some of the areas of display output component 110a. One or more of user input components 108a-108i may be used to navigate through GUI 180. For example, one user input component 108 may include a scroll wheel that may allow a user to select one or more graphical elements or icons 182 of GUI 180. Icons 182 may also be selected via a touch screen I/O component 109a that may include display output component 110a and an associated touch input component 108f. Such a touch screen I/O component 109a may employ any suitable type of touch screen input technology, such as, but not limited to, resistive, capacitive, infrared, surface acoustic wave, electromagnetic, or near field imaging. Furthermore, touch screen I/O component 109a may employ single point or multi-point (e.g., multi-touch) input sensing.

Icons 182 may represent various applications, layers, windows, screens, templates, elements, and/or other components that may be displayed in some or all of the areas of display component 110a upon selection by the user. Furthermore, selection of a specific icon 182 may lead to a hierarchical application navigation process. For example, selection of a specific icon 182 may lead from screen 190 of FIG. 2 to a new screen of GUI 180 that may include one or more additional icons or other GUI elements of the same application or of a new application associated with that icon 182 (e.g., as described with respect to one or more of screens 190a-190e of respective FIGS. 2A-2E). Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon labeled with a "News" textual indicator is selected, device 100 may launch or otherwise access a news application (e.g., Apple News™ available by Apple Inc.) that may provide user access to one or more collections of aggregated news articles (e.g., text, photos, and/or videos) from one or more publishers and/or of one or more grouped collections of article types and may display screens of a specific user interface that may include one or more tools or features for interacting with the aggregated news articles. As another example, when the specific icon labeled with a "Stocks" textual indicator is selected, device 100 may launch or otherwise access a specific stock application (e.g., Apple Stocks™ available by Apple Inc.) and may display screens of a specific user interface that may include one or more tools or features for identifying the performance of certain stocks and/or reading articles associated with the stocks and/or their underlying businesses. As another example, when the specific icon labeled with a "Books" textual indicator is selected, device 100 may launch or otherwise access a specific e-book application (e.g., iBooks™ available by Apple Inc.) and may display screens of a specific user interface that may include one or more tools or features for interacting with and/or discovering one or more e-books in a specific manner. As another example, when the specific icon labeled with a "Social Network" textual indicator is selected, device 100 may launch or otherwise access a specific social media application or site and may display screens of a specific user interface that may include one or more tools or features for interacting with one or more social media networks with which a user may or may not have an account in a specific manner. As another example, when the specific icon labeled with a "Health" textual indicator is selected, device 100 may launch or otherwise access a specific health application or site and may display screens of a specific user interface that may include one or more tools or features for determining or presenting the current and/or past health activities and/or biometric characteristics of a user (e.g., as may be detected by any suitable sensors of device 100 and/or of remote server 50) in a specific manner. For each application, screens may be displayed on display output component 110a and may include various user interface elements. Additionally or alternatively, for each application, various other types of non-visual information may be provided to a user via various other output components 110 of device 100.

Electronic device 100 also may include various other I/O components 109 that may allow for communication between device 100 and other devices, such as a connection port 109b that may be configured for transmitting and receiving data files, such as media files or customer order files, and/or any suitable information (e.g., audio signals) from a remote data source and/or power from an external power source. For example, I/O component 109b may be any suitable port (e.g., a Lightning™ connector or a 30-pin dock connector available by Apple Inc.). I/O component 109c may be a connection slot for receiving a SIM card or any other type of removable component. Electronic device 100 may also include at least one audio input component 108g, such as a microphone, and at least one audio output component 110b, such as an audio speaker. Electronic device 100 may also include at least one tactile output component 110c (e.g., a rumbler, vibrator, haptic and/or taptic component, etc.), a camera and/or scanner input component 108h (e.g., a video or still camera, and/or a bar code scanner or any other suitable scanner that may obtain product identifying information from a code, such as a bar code, or the like), and a biometric input component 108i (e.g., a fingerprint reader or other feature recognition sensor, which may operate in conjunction with a feature-processing application that may be accessible to electronic device 100 for authenticating a user).

Figure 2A:
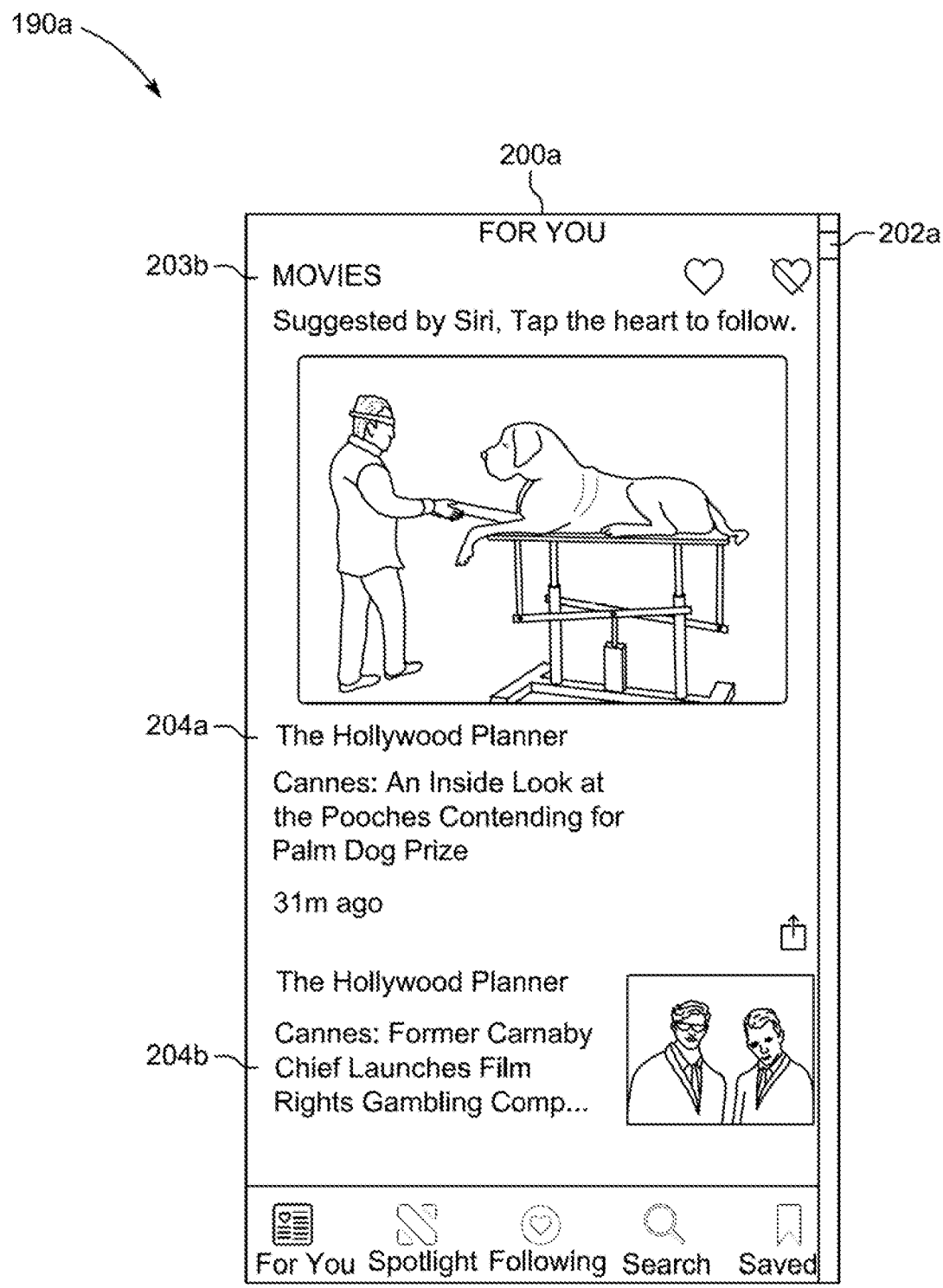
FIGS. 2A-2E are front views of screens of a graphical user interface of an electronic device of one or more of FIGS. 1 and 2 illustrating application navigation during which analytic data may be collected.

As just one example, device 100 may have access to an operating system application 103, which may be used to enable a user to launch one or more navigational applications, including, but not limited to, a news application 105 and a stocks application 107. FIGS. 2A-2E may illustrate certain particular navigations through a news application 105. For example, in response to selection (e.g., user selection) of the specific icon labeled with a "News" textual indicator at screen 190 of FIG. 2, device 100 (e.g., operating system application 103 (e.g., using processing circuitry 102)) may launch or otherwise access a news application 105 that may provide user access to one or more collections of aggregated news articles (e.g., text, photos, and/or videos) from one or more publishers and/or of one or more grouped collections of article types and may display screens of a specific user interface that may include one or more tools or features for interacting with the aggregated news articles (e.g., certain application data 53 (e.g., updated news/feed content) may be received from remote server 50 (e.g., using communications circuitry 114) for updating the news articles or other data utilized by application 105). As shown in FIG. 2A, for example, when news application 105 is initially launched, an initial screen 190a of content may be presented that may provide a high-level news recommendation feed 200a (e.g., a "For You" news feed). High-level news recommendation feed 200a may include any suitable number of links (e.g., using textual, pictoral, graphical, or other suitable content) to various news articles, which may be organized into one or more groups. For example, as shown by screen 190a of FIG. 2A and screen 190d of FIG. 2D, which may be scrolled to from screen 190a using any suitable user input gesture (e.g., as indicated by the altered position of scroll indicator 202a), high-level news recommendation feed 200a may include any suitable content, such as article links 204a and 204b that may be organized into a first group that may be identified by a first group link 203b (e.g., a "Movies" group of one or more links to articles related to movies), and article links 204c, 204d, and 204e that may be organized into a second group that may be identified by a second group link 203e (e.g., a "Food" group of one or more links to articles related to food). A user may interact with high-level news recommendation feed 200a of news application 105 in any suitable manner to arrive at a particular news article. In some embodiments, a user may select a news article link directly from high-level news recommendation feed 200a in order to access a news article. For example, a user may select news article link 204e of the second group 203e of high-level news recommendation feed 200a of FIG. 2D, responsive to which news application 105 may be operative to obtain and present screen 190e of content of FIG. 2E that may provide a specific news article 200e (e.g., a "Bake" news article), which may include any suitable news article content, such as text and an embedded video 203ev. As shown, screen 190e may also include any suitable navigation features, such as a scroll indicator 202e for scrolling through the content of news article 200e, a pause/play icon 203evi that may be selectable to alternatively play or pause or otherwise control the playback of video 203ev, a back navigation button 201e that may be selectable to navigate backwards through news application 105 (e.g., back to screen 190d of FIG. 2D), and/or a next article button 206e that may be selectable to navigate to a new news article (e.g., to the article associated with news article link 204d of FIG. 2D). Alternatively, in some other embodiments, a user may first select a particular group or type of news article, responsive to which the news application may present a group-level news recommendation feed specific to the selected group, from which the user may then select a news article link. For example, a user may select first group link 203b (e.g., the link associated with the "Movies" group) of high-level news recommendation feed 200a of FIG. 2A, responsive to which news application 105 may be operative to obtain and present screen 190b of content of FIG. 2B that may provide a group-level news recommendation feed 200b (e.g., a "Movies" news feed) that may only or mostly include links to news articles related to movies, such as article links 205a, 205b, and 205c. As shown, screen 190b may also include any suitable navigation features, such as a scroll indicator 202b for scrolling through the content of group-level news recommendation feed 200b, and/or a back navigation button 201b that may be selectable to navigate backwards through news application 105 (e.g., to screen 190a of FIG. 2A). Then, a user may select news article link 205b of group-level news recommendation feed 200b of FIG. 2B, responsive to which news application 105 may be operative to obtain and present screen 190c of content of FIG. 2C that may provide a specific news article 200c (e.g., an "Actor" news article), which may include any suitable news article content. As shown, screen 190c may also include any suitable navigation features, such as a scroll indicator 202c for scrolling through the content of news article 200c, a back navigation button 201c that may be selectable to navigate backwards through news application 105 (e.g., to screen 190b of FIG. 2B), and/or a next article button 206c that may be selectable to navigate to a new news article (e.g., to news article 200e of FIG. 2E).

Any event that may result in news application 105 transitioning from a first feed to a second feed or from a feed to an article or from a first article to a second article may be referred to herein as a navigation event, as the application may navigate from a first view or first type of content to a second view or second type of content within the hierarchical application. For example, selection of a group link 203b or 203e may be a navigation event for transitioning from high-level news recommendation feed 200a to a particular group-level news recommendation feed (e.g., feed 200b). As another example, selection of an article links 204a, 204b, 204c, 204d, or 204e or selection of a next article button 206c or 206e or selection of a back navigation button 201b, 201c, or 201e may be a navigation event for transitioning from high-level news recommendation feed 200a or from a group-level news recommendation feed (e.g., feed 200b) to a particular article or vice versa or from an article to another article. One or more particular navigation events may also be referred to herein as an analytic event, in response to which application 105 may be operative to collect certain data for defining an analytics payload of data that may then be shared by device 100 with any suitable entity (e.g., as analytics payload data 57 with remote server 50) for use by that suitable entity to perform any suitable analysis on that data for any suitable purpose. For example, any navigation event that ends a presentation of a particular article may also be defined to be an analytic event that may result in certain analytic data being collected for defining analytics payload data 57 for the presentation of that article, where such analytics payload data 57 may then be used to analyze how a user arrived at that presented article (e.g., directly from a high-level news recommendation feed or from a group-level news recommendation feed), how long a user viewed the article, whether or how often a user played back any video embedded in the article, and/or the like. Certain analytic data to be collected in response to a certain analytic event for defining analytics payload data 57 may not be originally captured particularly for the view at which the analytic event occurred. For example, when a particular analytic event may occur in response to the application navigating away from the presentation of a particular article, certain analytic data to be collected for defining analytics payload data 57 associated with that article may not be analytic data that was originally captured based on the presentation of that article (e.g., the duration of time in which a user viewed the presentation of the article). Instead, some analytic data that may be collected for defining analytics payload data 57 for the article may be originally captured when the application navigated from a high-level news recommendation feed to a group-level news recommendation feed (e.g., a group-level news recommendation feed from which the application then navigated to the article of the analytic event). Therefore, application 105 may be designed to capture and store analytic data in a particular manner such that application 105 may be able to collect the appropriate analytic data in an effective and efficient manner for defining analytics payload data 57. For example, analytic data for a particular view of content (e.g., a particular feed or a particular article) may be captured and stored in a particular module of that particular view, but that module may then be linked to another particular module of another particular view (e.g., a child view of another particular view from which the application navigated to the child view in response to a navigation event) in which other analytic data for that other particular view may be stored. Therefore, view-specific analytic data may be captured by and stored at a view-specific module but then linked to other view-specific analytic data that may be captured by and stored at another view-specific module (e.g., a child of the first view-specific module). Then, in response to a particular analytic event at a particular view-specific module, the application may be operative to collect only the necessary analytic data captured by one or more modules included in a navigational path associated with the view-specific module at which the particular analytic event was detected. This may significantly increase the flexibility and speed and efficiency and effectiveness of the application's ability to define analytics payload data 57 for a particular analytic event. This may reduce the amount of data passed between modules and/or the amount of data stored in modules.

Figure 3:
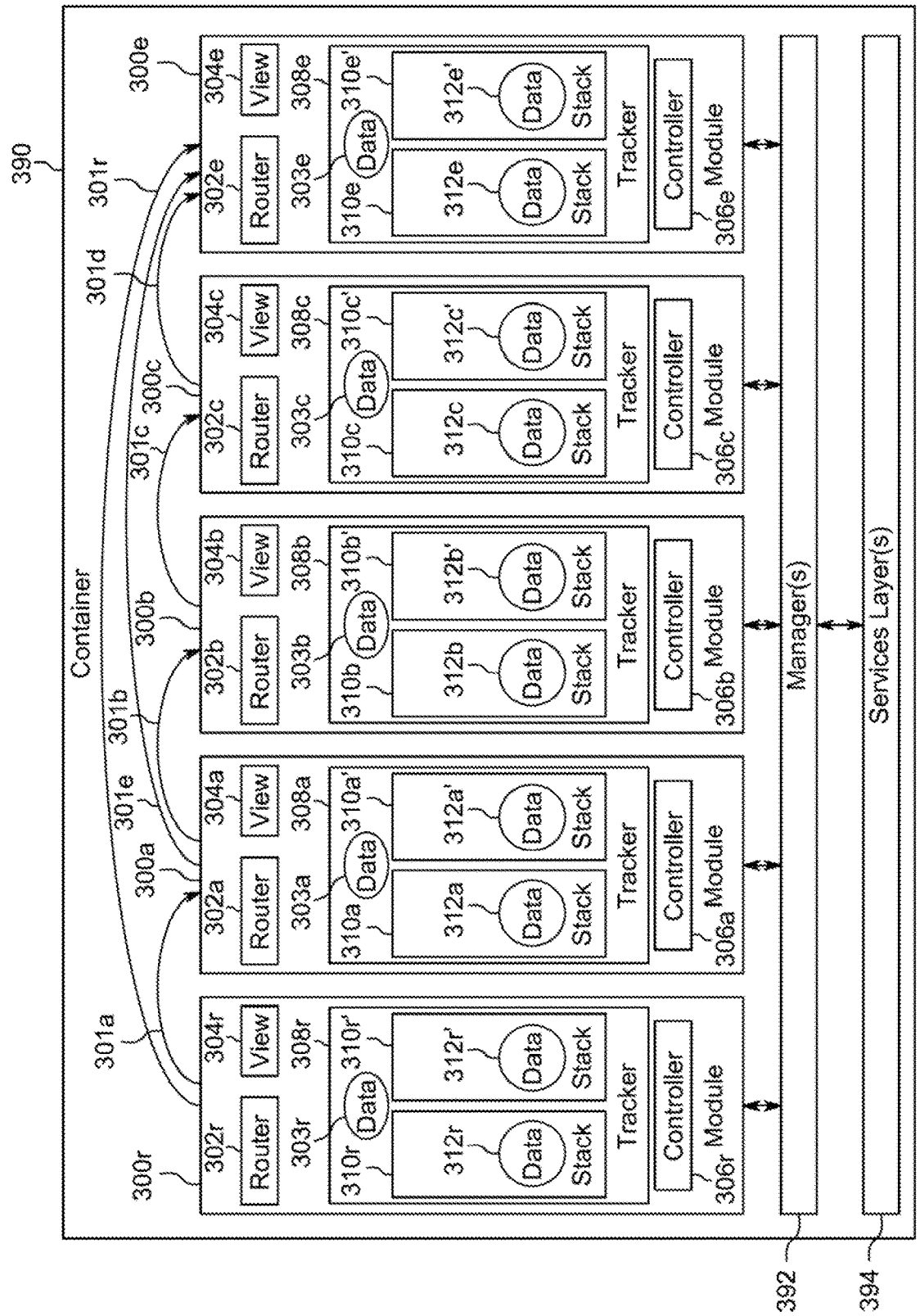
FIG. 3 is an exemplary schematic diagram of an application of an electronic device of one or more of FIGS. 1-2E that may be navigated.

As shown in FIG. 3, for example, when application 105 is launched for use on device 100, application 105 may create a container 390 (e.g., a dependency injection container, in which dependencies between application components may be managed (e.g., by implementing an inversion of control concept)). Application 105 may be designed to include or support any suitable number of modules, such as modules 300r, 300a, 300b, 300c, and 300e. Each module may be considered to be associated with a particular type of feature or view of the application. For example, with respect to a news application, the news application may include a first module for a high-level news recommendation feed (e.g., module 300a may be associated with high-level news recommendation feed 200a), a second module for a group-level news recommendation feed (e.g., module 300b may be associated with movies group-level news recommendation feed 200b), a third module for a particular article (e.g., module 300c may be associated with actor article 200c), a fourth module for another particular article (e.g., module 300e may be associated with bake article 200e), and/or a fifth module for a root of the application (e.g., module 300a may be associated with the root of application 105 (e.g., an app delegate that may be an entry point to the application)). Each module may be configured to have very clear and well-defined interfaces, and may be configured to be independent of other modules. Application 105 and/or the modules thereof may be configured using any suitable application architecture, such as by using model-view-controller ("MVC") as an application architecture, by using view-interactor-presenter-entity-routing ("VIPER") as an application architecture, by using any other application architecture, or any combination thereof. The different modules (e.g., modules 300a, 300b, 300c, 300d, and 300e) may be distinct from one another and may not independently store the same analytic data. Such modules may also be referred to herein as the individual objects that may provide the functionality for a part of the application. Each module may represent one view of the application. An application may be made up of various different objects, some of which may hold state or other information that may be useful for analytic tracking. The generation of analytic events may happen in different objects than where the data may exist, and the analytics system may allow for multiple trackers that may track data independently of where events may be generated.

As just one example, as shown in FIG. 3, each one of modules 300r, 300a, 300b, 300c, and 300e may be configured to include a router (e.g., routers 302r, 302a, 302b, 302c, and 302e, respectively), a view (e.g., views 304r, 304a, 304b, 304c, and 304e, respectively), a controller (e.g., controllers 306r, 306a, 306b, 306c, and 306e, respectively), and a tracker (e.g., trackers 308r, 308a, 308b, 308c, and 308e, respectively), while each one of trackers 308r, 308a, 308b, 308c, and 308e may be operative to store tracker reference data (e.g., tracker reference data 303r, 303a, 303b, 303c, and 303e, respectively) and to generate and manage one or more data stacks with one or more data objects (e.g., tracker 308r may provide stack 310r with data object 312r and stack 310r' with data object 312r', tracker 308a may provide stack 310a with data object 312a and stack 310a' with data object 312a', tracker 308b may provide stack 310b with data object 312b and stack 310b' with data object 312b', tracker 308c may provide stack 310c with data object 312c and stack 310c' with data object 312c', and tracker 308e may provide stack 310e with data object 312e and stack 310e' with data object 312e'). Each one of modules 300r, 300a, 300b, 300c, and 300e may be configured to include a model (not shown), where a model may be configured to express the application's behavior in terms of the problem domain, independent of the user interface and/or may be configured to directly manage the data, logic, and rules of the application. Each view can be any output representation of information, such as a news feed, a news article, a chart, a diagram, or the like (e.g., a presentation of a respective model in a particular format). Each controller may be configured to accept inputs (e.g., user inputs from any input component circuitry 108) and convert inputs into commands for a respective model or view (e.g., a module's controller may respond to a user input and perform interactions on the data model objects (e.g., by validating a received input and then passing the input to the module's model)). For example, a controller may be operative to manage a portion of the application's user interface (e.g., the view that shares a module with the controller) as well as the interactions between that interface and the underlying data. In some embodiments, the controllers of the modules may be operative to facilitate transitions between different modules (e.g., between different module views of the user interface). As also shown in FIG. 3, for example, one or more managers 392 may be provided for enabling one or more of the modules to communicate with one or more service layers 394 (e.g., for data requests from a data store (e.g., from remote server 50 via communications circuitry 114)).

Figure 2B:
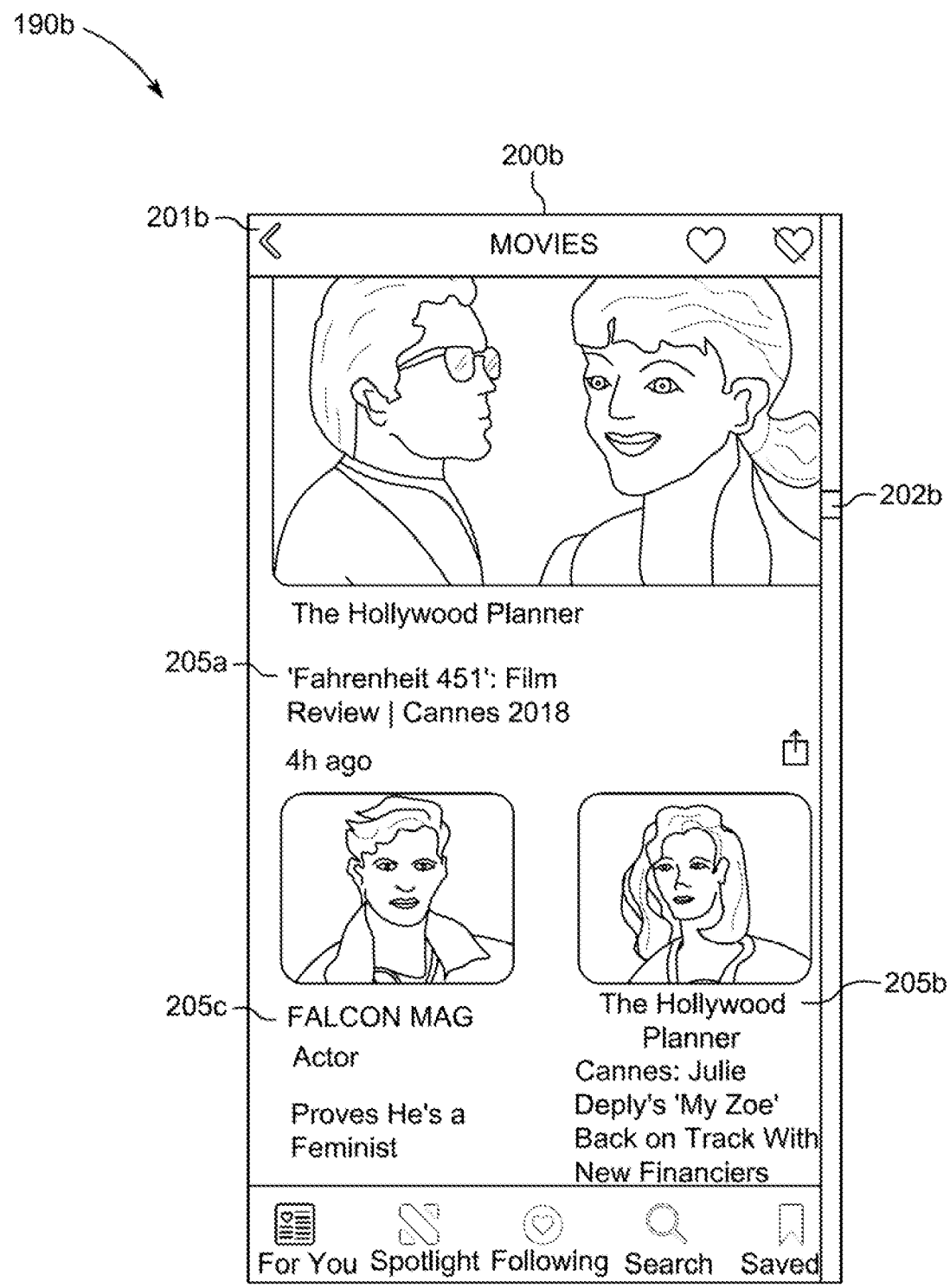
Figure 2C:
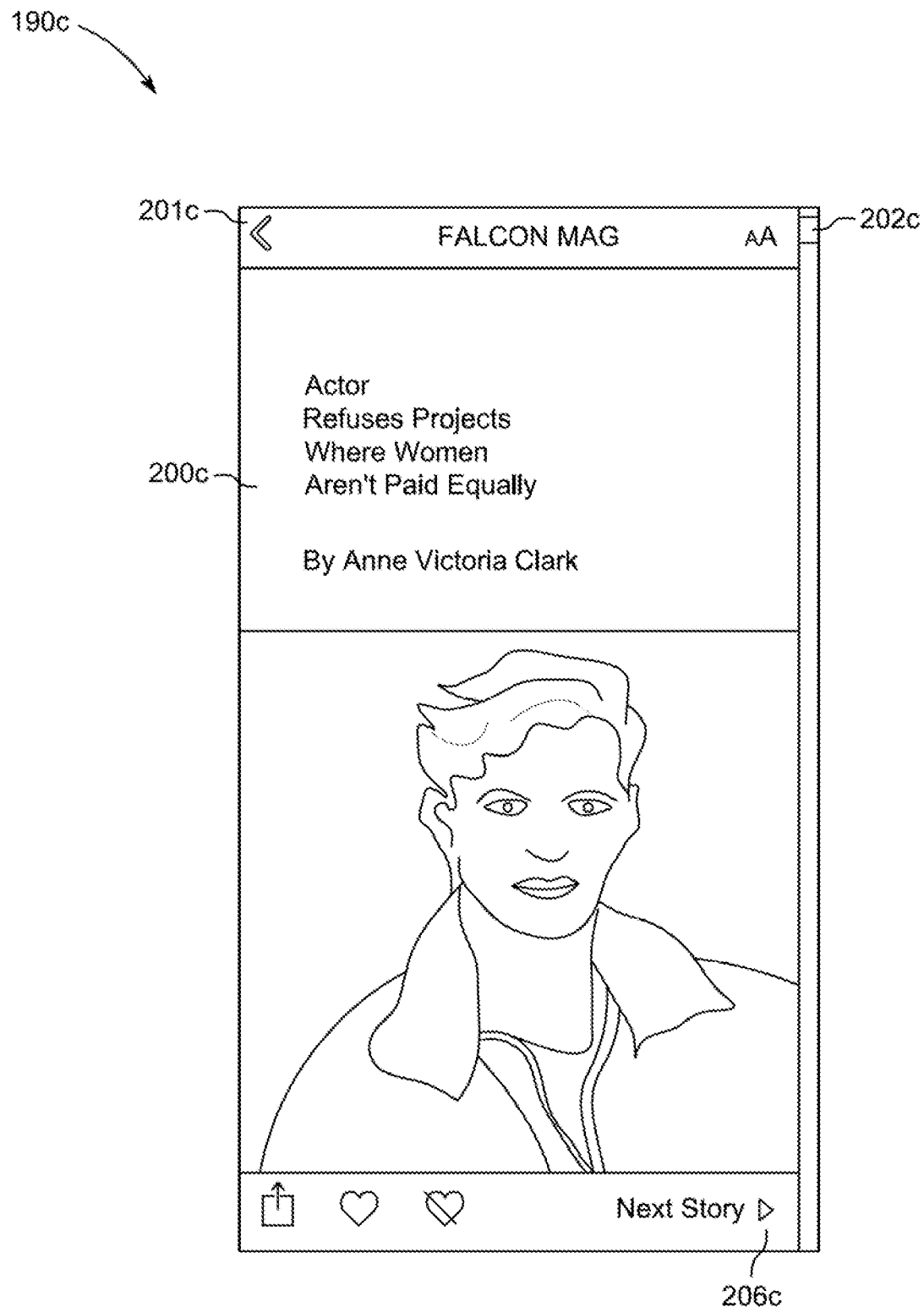

Each module may be configured to independently manage its own tracker and the storage of one or more analytic data objects in one or more particular tracker stacks for tracking any suitable types of analytic data associated with the content of that module's user interface view. As the application is navigated from one view to another view, each view's module may retain analytic data associated with its view, and such analytic data may later be collected from various modules in response to a particular analytic event. As just one example, FIGS. 2A-2C, FIG. 3, and FIGS. 4A and 4B may illustrate how different types of analytic data may be stored by different trackers of different modules and then later collected in response to an analytic event that may terminate the presentation of news article 200c that was navigated to from high-level news recommendation feed 200a via group-level news recommendation feed 200b. As shown in FIGS. 2A-2C, a user may select first group link 203b (e.g., the link associated with the "Movies" group) of high-level news recommendation feed 200a of FIG. 2A, responsive to which news application 105 may be operative to obtain and present screen 190b of content of FIG. 2B that may provide group-level news recommendation feed 200b (e.g., a "Movies" news feed) that may only or mostly include links to news articles related to movies, such as article links 205*a*, 205*b*, and 205*c*, and, then, the user may select news article link 205*b* of group-level news recommendation feed 200*b* of FIG. 2B, responsive to which news application 105 may be operative to obtain and present screen 190*c* of content of FIG. 2C that may provide a specific news article 200*c* (e.g., an "Actor" news article), which may include any suitable news article content. As shown in diagram 400*a* of FIG. 4A, high-level news recommendation feed 200*a* of screen 190*a* may be provided by view 304*a* of module 300*a*, group-level news recommendation feed 200*b* of screen 190*b* may be provided by view 304*b* of module 300*b*, and news article 200*c* of screen 190*c* may be provided by view 304*c* of module 300*c*.

Figure 4A:
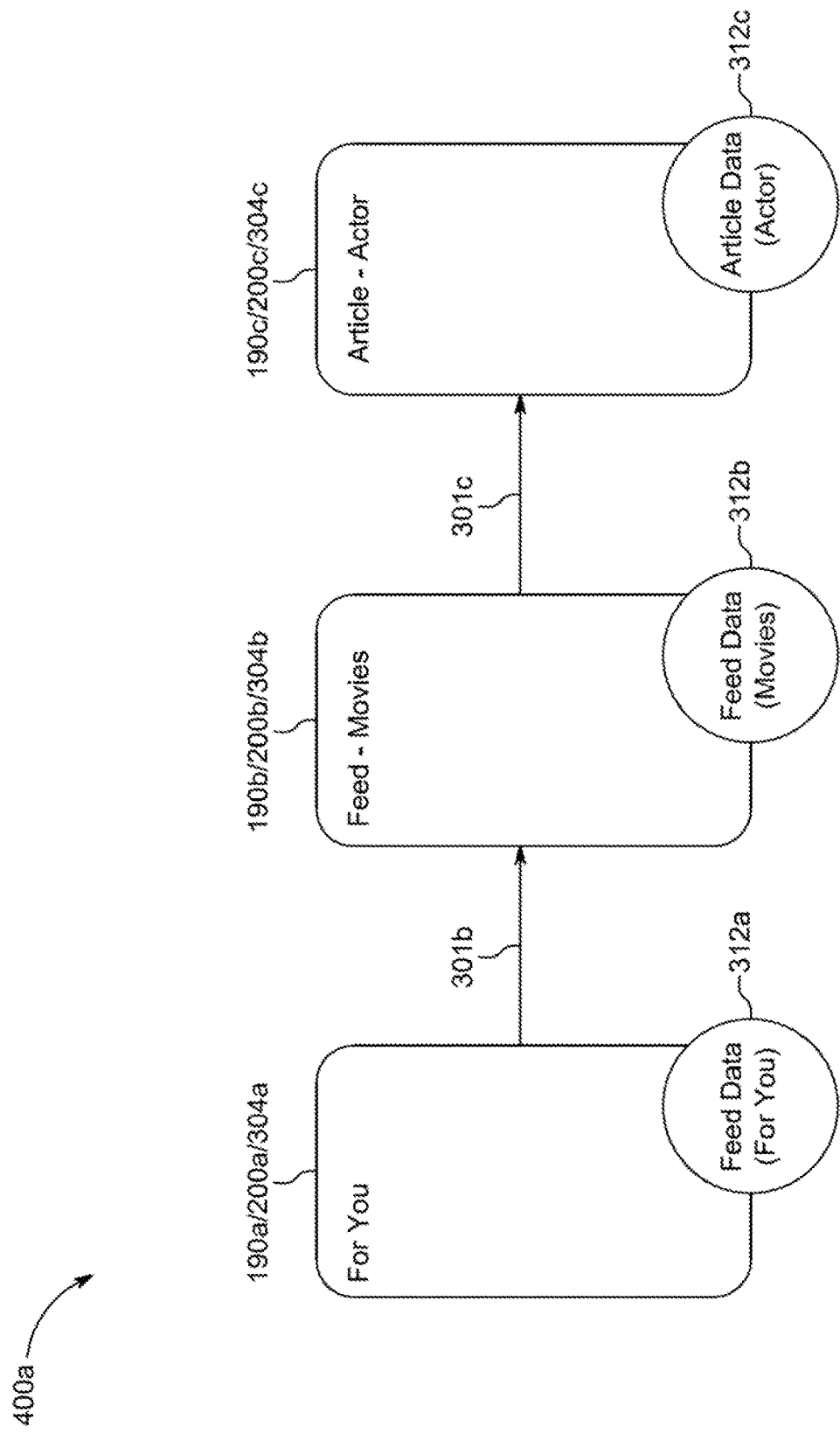
FIG. 4A is an exemplary schematic diagram of an application of one or more of FIGS. 1-3 as navigated in a first particular manner.
Figure 4B:
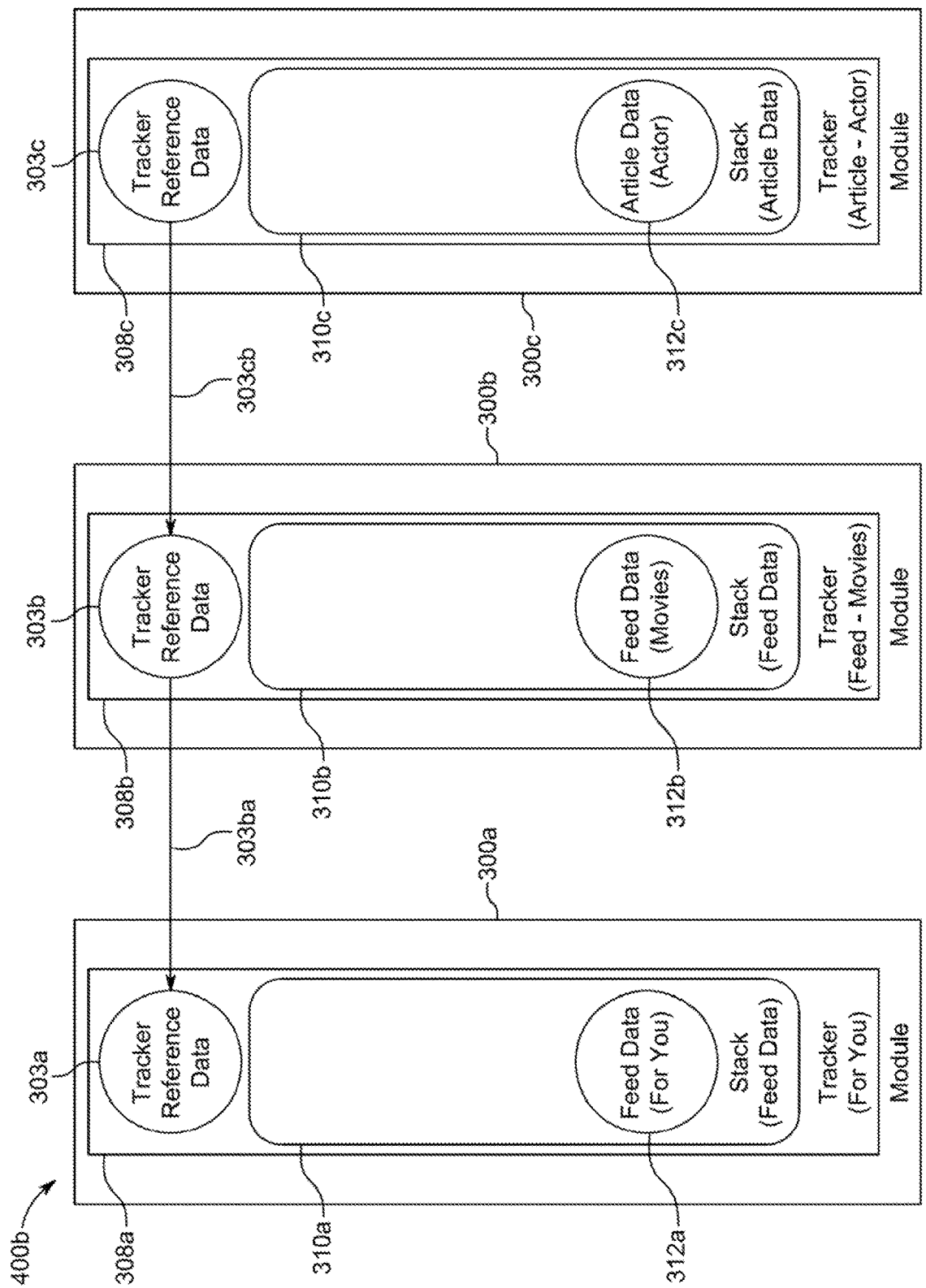
FIG. 4B is a more detailed exemplary schematic diagram of the application of FIG. 4A as navigated in the first particular manner.

When a particular navigation event is detected by module 300*a* (e.g., by controller 306*a*) for navigating from view 304*a* to view 304*b* (e.g., when user selection of first group link 203*b* of high-level news recommendation feed 200*a* is detected), module 300*a* may be operative to utilize a navigation route 301*b* of application 105 for navigating from view 304*a* of module 300*a* to view 304*b* of module 300*b* (e.g., router 302*a* of module 300*a* may be operative to load module 300*b* as a child of module 300*a*). Such navigation to a new module may also include storage of tracker reference data in the new module that may be operative to reference back to the tracker of the previous module. For example, in response to detecting a navigation event for navigating from view 304*a* to view 304*b* utilizing navigation route 301*b*, module 300*a* may be operative not only to initiate the loading of new module 300*b*, but module 300*a* may also be operative to store tracker reference data 303*b* in tracker 308*b* of module 300*b*, which may later be used by module 300*b* for identifying module 300*a* during collection of analytic data for an analytic event (e.g., for identifying module 300*a* as a parent of module 300*b* (e.g., for identifying tracker 308*a* as a parent of tracker 308*b*)). Moreover, when view 304*a* is initially presented by module 300*a* (e.g., as high-level news recommendation feed 200*a* of screen 190*a* via any suitable output component circuitry 110), at any other suitable time during presentation of view 304*a*, and/or in response to detecting a navigation event for navigating away from the presentation of view 304*a*, module 300*a* may be operative to identify and store any suitable analytic data in one or more tracker stacks of tracker 308*a*. For example, as shown in FIGS. 4A and 4B, "For You" feed data 312*a* may be stored in a feed data stack 310*a* of a for you tracker 308*a* of module 300*a*, where any such analytic data may be of a particular application field data type associated with that stack (e.g., for you analytic feed data). For example, stack 310*a* may be associated with a unique identifier that is unique to a particular application field data type or particular type of analytic data (e.g., for you analytic feed data), and such a unique identifier may also be used by any suitable analytic event (e.g., as an analytic field data type) to indicate which type(s) of analytic data ought to be collected for that analytic event. For you analytic feed data 312*a* of stack 310*a* may be any suitable analytic data associated with the for you feed data of view 304*a* that may be pertinent to the navigation from view 304*a* to view 304*b*, including, but not limited to, identification of first group link 203*b* (e.g., the link associated with the "Movies" group) that was selected by the navigation event at high-level news recommendation feed 200*a*, the location (e.g., position) of that selected group link within the list of group links of view 304*a*, identification of feed 200*a*, the time at which view 304*a* was initially presented, the time at which the navigation event away from view 304*a* was detected, the total duration of time during which view 304*a* was presented, the time and type of any user input interaction(s) detected during presentation of view 304*a* (e.g., any scrolling events between screen 190*a* and screen 190*d* of view 304*a*), and/or the like that may be useful for analyzing user interaction with application 105 for a particular analytic event.

When a particular navigation event is detected by module 300*b* (e.g., by controller 306*b*) for navigating from view 304*b* to view 304*c* (e.g., when user selection of news article link 205*c* of group-level news recommendation feed 200*b* is detected), module 300*b* may be operative to utilize a navigation route 301*c* of application 105 for navigating from view 304*b* of module 300*b* to view 304*c* of module 300*c* (e.g., router 302*b* of module 300*b* may be operative to load module 300*c* as a child of module 300*b*). Such navigation to a new module may also include storage of tracker reference data in the new module that may be operative to reference back to the tracker of the previous module. For example, in response to detecting a navigation event for navigating from view 304*b* to view 304*c* utilizing navigation route 301*c*, module 300*b* may be operative not only to initiate the loading of new module 300*c*, but module 300*b* may also be operative to store tracker reference data 303*c* in tracker 308*c* of module 300*c*, which may later be used by module 300*c* for identifying module 300*b* during collection of analytic data for an analytic event (e.g., for identifying module 300*b* as a parent of module 300*c* (e.g., for identifying tracker 308*b* as a parent of tracker 308*c*)). Moreover, when view 304*b* is initially presented by module 300*b* (e.g., as group-level news recommendation feed 200*b* of screen 190*b* via any suitable output component circuitry 110), at any other suitable time during presentation of view 304*b*, and/or in response to detecting a navigation event for navigating away from the presentation of view 304*b*, module 300*b* may be operative to identify and store any suitable analytic data in one or more tracker stacks of tracker 308*b*. For example, as shown in FIGS. 4A and 4B, "Movies" feed data 312*b* may be stored in a feed data stack 310*b* of a movies feed tracker 308*b* of module 300*b*, where any such analytic data may be of a particular application field data type associated with that stack (e.g., movies analytic feed data). For example, stack 310*b* may be associated with a unique identifier that is unique to a particular application field data type or particular type of analytic data (e.g., movies analytic feed data), and such a unique identifier may also be used by any suitable analytic event (e.g., as an analytic field data type) to indicate which type(s) of analytic data ought to be collected for that analytic event. Movies analytic feed data 312*b* of stack 310*b* may be any suitable analytic data associated with the movies feed data of view 304*b* that may be pertinent to the navigation from view 304*b* to view 304*c*, including, but not limited to, identification of news article link 205*c* (e.g., the link associated with the "Actor" article) that was selected by the navigation event at group-level news recommendation feed 200*b*, the location (e.g., position) of that selected article link within the list of movie feed article links of view 304*b*, identification of feed 200*b*, the time at which view 304*b* was initially presented, the time at which the navigation event away from view 304*b* was detected, the total duration of time during which view 304*b* was presented, the time and type of any user input interaction(s) detected during presentation of view 304*b* (e.g., any scrolling events), and/or the like that may be useful for analyzing user interaction with application 105 for a particular analytic event.

When a particular navigation event is detected by module 300*c* (e.g., by controller 306*c*) for navigating away from view 304*c* (e.g., to view 304*e* (e.g., when user selection of next article button 206*c* of news article 200*c* is detected)), module 300c may be operative to utilize a navigation route 301d of application 105 for navigating from view 304c of module 300c to view 304e of module 300e (e.g., router 302c of module 300c may be operative to load module 300e as a child of module 300c). Such navigation to a new module may also include storage of tracker reference data in the new module that may be operative to reference back to the tracker of the previous module. For example, in response to detecting a navigation event for navigating from view 304c to view 304e utilizing navigation route 301d, module 300c may be operative not only to initiate the loading of new module 300e, but module 300c may also be operative to store tracker reference data 303e in tracker 308e of module 300e, which may later be used by module 300e for identifying module 300c during collection of analytic data for an analytic event (e.g., for identifying module 300c as a parent of module 300e (e.g., for identifying tracker 308c as a parent of tracker 308e)). Moreover, when view 304c is initially presented by module 300c (e.g., as actor article 200c of screen 190c via any suitable output component circuitry 110), at any other suitable time during presentation of view 304c, and/or in response to detecting a navigation event for navigating away from the presentation of view 304c, module 300c may be operative to identify and store any suitable analytic data in one or more tracker stacks of tracker 308c. For example, as shown in FIGS. 4A and 4B, "Actor" article data 312c may be stored in an article data stack 310c of an article data tracker 308c of module 300c, where any such analytic data may be of a particular application field data type associated with that stack (e.g., article analytic data). For example, stack 310c may be associated with a unique identifier that is unique to a particular application field data type or particular type of analytic data (e.g., article analytic data), and such a unique identifier may also be used by any suitable analytic event (e.g., as an analytic field data type) to indicate which type(s) of analytic data ought to be collected for that analytic event. Article analytic data 312c of stack 310c may be any suitable analytic data associated with the actor article data of view 304c that may be pertinent to the navigation from view 304c to view 304e, including, but not limited to, identification of next article button 206c that was selected by the navigation event at news article 200c, identification of article 200c, the time at which view 304c was initially presented, the time at which the navigation event away from view 304c was detected, the total duration of time during which view 304c was presented, the time and type of any user input interaction(s) detected during presentation of view 304c (e.g., any scrolling events), and/or the like that may be useful for analyzing user interaction with application 105 for a particular analytic event.

A navigation event that terminates a presentation of a particular article may also be defined to be an analytic event that may result in certain analytic data being collected for defining analytics payload data 57 for the presentation of that article, where such analytics payload data 57 may then be used to analyze the user's interaction with that article and navigation to that article. For example, when an event is detected by module 300c for navigating away from the presentation of the actor news article of view 304c, that event may be determined to be an analytic event, and such an analytic event may be determined to be associated with one or more particular analytic field data types. For example, an analytic event for navigation from a presented news article may be defined to be associated with one or more required analytic field data types and/or one or more optional analytic field data types. As a particular example, an analytic event for a presented news article of news application 105 may require collection of analytic data of any suitable required analytic field data types, including, but not limited to, article analytic data and feed analytic data, while such an analytic event for a presented news article of news application 105 may optionally accept collection of analytic data of any suitable optional analytic field data types, including, but not limited to, group analytic data and play state analytic data. Continuing with the example navigation of FIGS. 2A-2C, 4A, and 4B, in which an analytic event requiring analytic field data types of article analytic data and feed analytic data may be detected for terminating presentation of view 304c of module 300c, device 100 may be configured to identify each analytic field data type associated with that analytic event, and then obtain from tracker 308c of current module 300c at least one analytic data object from each stack of tracker 308c that is associated with an application field data type that matches an analytic field data type of the analytic event. In such an example, module 300c may be operative to determine that the application field data type associated with stack 310c (e.g., article analytic data type) matches an analytic field data type associated with the detected analytic event (e.g., article analytic data type) and may then collect at least one data object from that stack 310c (e.g., article analytic data 312c of stack 310c) for defining at least a portion of analytics payload data 57 for the analytic event. In some embodiments, only the data object most recently stored in a stack may be collected when the field data type of that stack is determined to match a field data type of an analytic event. In other embodiments, each data object stored in a stack may be collected when the field data type of that stack is determined to match a field data type of an analytic event.

When a current module is determined not to include a stack associated with a field data type of an analytic event, then the parent module of the current module may be identified and examined to determine if the parent module includes a stack associated with that currently unfulfilled field data type of the analytic event. Continuing with the example in which an analytic event requiring analytic field data types of article analytic data and feed analytic data may be detected for terminating presentation of view 304c of module 300c, after at least one data object from stack 310c of tracker 308c of module 300c may be collected for at least partially defining analytics payload data 57 for the analytic event due to the article analytic field data type of that stack being determined to match the article analytic field data type of an analytic event, it may be determined that tracker 308c does not include any stack with a field data type that matches the feed analytic data type of the analytic event. In response to such a determination, a parent module of module 300c may be identified in order to determine if that parent module includes any stack with a field data type that matches the feed analytic data type of the analytic event. For example, tracker reference data 303c of module 300c may be used to identify module 300b as the parent module of module 300c and then the system may walk back through the tracker chain (e.g., along a path 303cb) from tracker 308c of module 300c to tracker 308b of parent module 300b to determine whether that parent tracker 308b includes a stack associated with an as of yet unfulfilled field data type of the analytic event (e.g., a feed analytic data type). Indeed, as shown, it may be determined that the field data type of stack 310b may match the unfulfilled feed field data type of the analytic event. In such an example, it may be determined that the application field data type associated with stack 310b (e.g., feed analytic data type) matches an as of yet unfulfilled analytic field data type associated with the detected analytic event (e.g., feed analytic data type) and may then collect at least one data object from that stack 310b (e.g., feed analytic data 312b of stack 310b) for defining another portion of analytics payload data 57 for the analytic event. In some embodiments, only the data object most recently stored in a stack may be collected when the field data type of that stack is determined to match a field data type of an analytic event. In other embodiments, each data object stored in a stack may be collected when the field data type of that stack is determined to match a field data type of an analytic event. Therefore, analytics payload data 57 may be defined to include collected article data 312c of stack 310c of tracker 308c of module 300c and collected feed data 312b of stack 310b of tracker 308b of module 300b.

Once analytic data has been obtained from an initially identified stack for each field data type of an analytic event while tracking backwards the application navigation from the module that detected the analytic event, no more analytic data may need to be collected from any other stacks. For example, continuing with the example in which an analytic event requiring analytic field data types of article analytic data and feed analytic data may be detected for terminating presentation of view 304c of module 300c, after at least one data object from stack 310c of tracker 308c of module 300c may be collected for at least partially defining analytics payload data 57 for the analytic event due to the article analytic field data type of that stack being determined to match the article analytic field data type of the analytic event, and after at least one data object from stack 310b of tracker 308b of module 300b may be collected for at least partially defining analytics payload data 57 for the analytic event due to the feed analytic field data type of that stack being determined to match the feed analytic field data type of the analytic event, then the system may determine that no additional article analytic field data or no additional feed analytic field data needs to be collected. For example, the system may be configured not to bother tracking back further to module 300b's parent module 300a in order to obtain any additional feed analytic field data from module 300a (e.g., feed analytic data 312a from stack 310a of tracker 308a of module 300a) as the feed analytic field data type requirement of the analytic event has already been fulfilled by data 312b of stack 310b of tracker 308b of module 300b. This may reduce the size of analytics payload data 57 and/or the amount of data that must be collected or maintained in the system. For example, although feed data 312b and feed data 312a may provide different types of information, both feed data 312b and feed data 312a may be feed data stored in stacks that match the feed analytic field data type of the analytic event and only the most recently stored data (e.g., of data 312b of child module 300b) may be of interest for the analytic event. Alternatively, in other embodiments, all feed data available to all stacks from all modules in a navigation path may be collected for a particular analytic event. Moreover, in some embodiments, in addition to collecting at least one data object from at least one stack that matches each field data type of the analytic event for defining analytics payload data 57 for the analytic event, navigation path data may also be included as a portion of analytics payload data 57. For example, even if all of the field data types of the analytic event have been satisfied by article analytic data 312c from stack 310c of tracker 308c of module 300c and by feed analytic data 312b from stack 310b of tracker 308b of module 300b, the full navigation path within application 105 for arriving at article 200c of view 304c that triggered the analytic event may be determined and included as a portion of analytics payload data 57 for that analytic event. In such embodiments, tracker reference data 303b of module 300b may be used to identify module 300a as the parent module of module 300b and then the system may walk back through the tracker chain (e.g., along a path 303ba) from tracker 308b of module 300b to tracker 308a of parent module 300a to enable definition of the full navigation path within application 105 (e.g., from module 300a to module 300b to module 300c) and information indicative of that path may be included in the definition of analytics payload data 57 along with data 312c and data 312b.

Figure 2D:
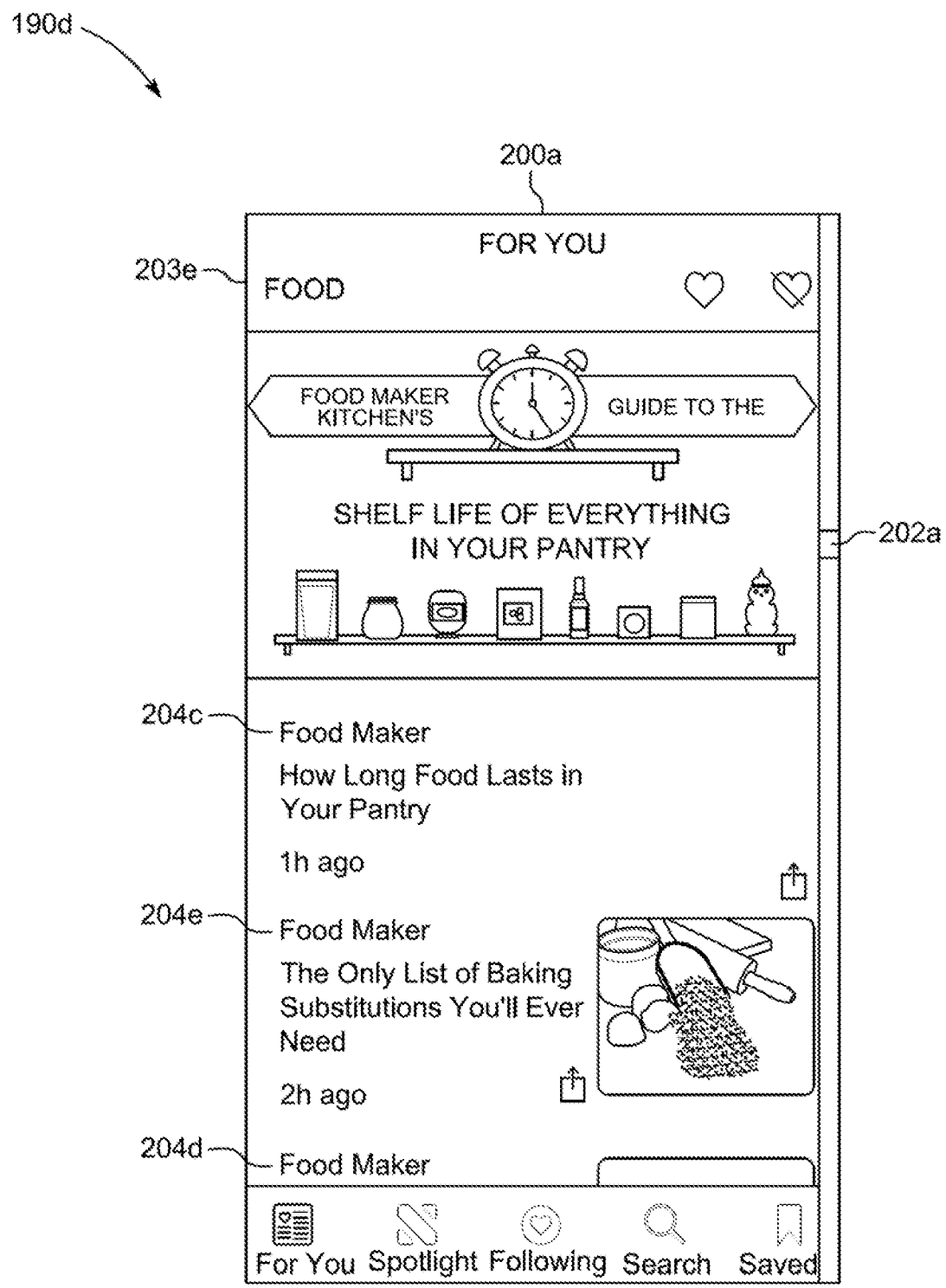
Figure 2E:
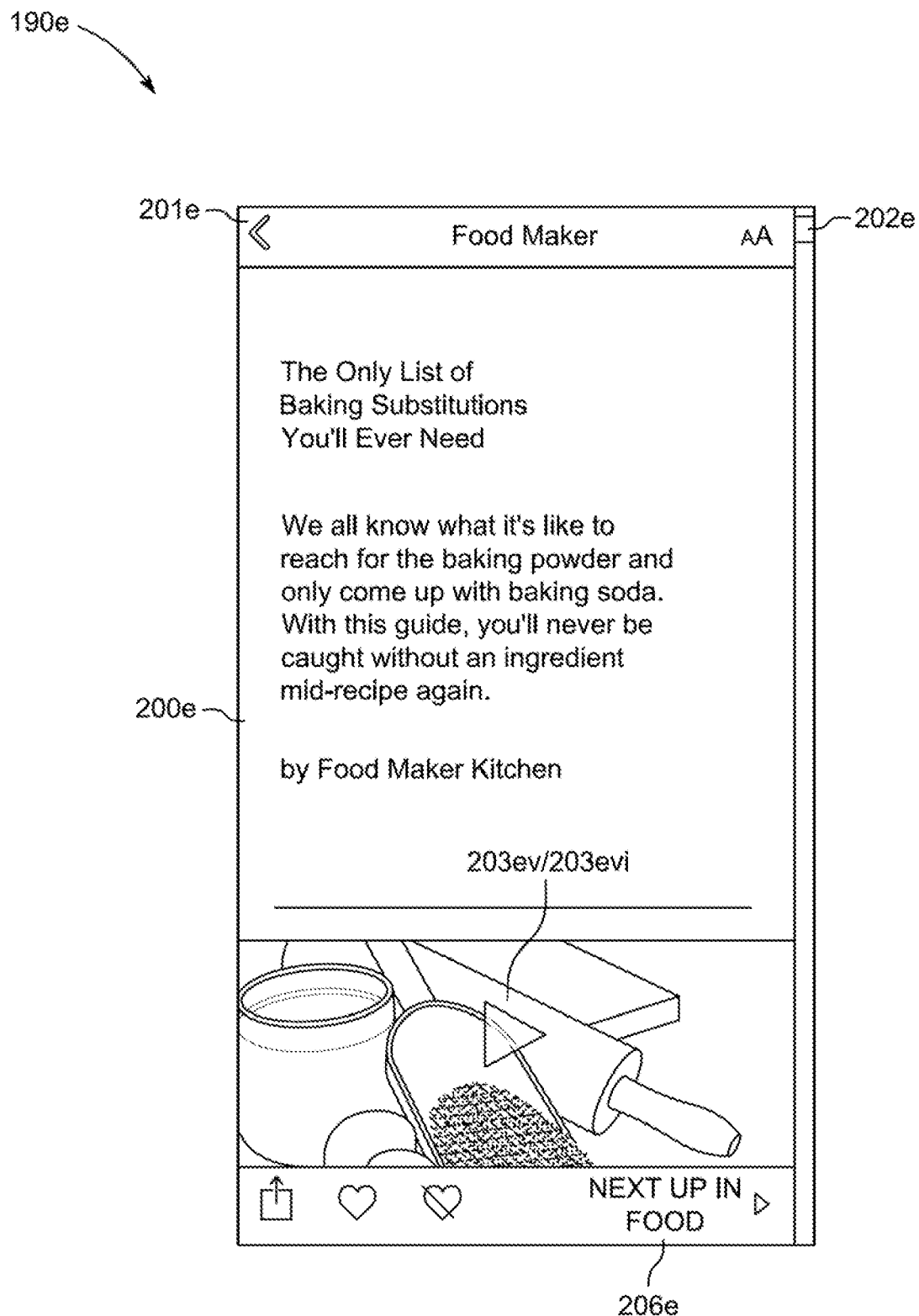

As just one other example, FIGS. 2D, 2E, 3, 5A, and 5B may illustrate how different types of analytic data may be stored by different trackers of different modules and then later collected in response to an analytic event that may terminate the presentation of news article 200c that was navigated thereto directly from high-level news recommendation feed 200a (e.g., not via a group-level news recommendation feed). As shown in FIGS. 2D and 2E, a user may select first article link 204e of high-level news recommendation feed 200a of FIG. 2D, responsive to which news application 105 may be operative to obtain and present screen 190e of content of FIG. 2E that may provide a specific news article 200e (e.g., a "Bake" news article), which may include any suitable news article content. As shown by diagram 500a of FIG. 5A, high-level news recommendation feed 200a of screen 190d may be provided by view 304a of module 300a, and news article 200e of screen 190e may be provided by view 304e of module 300e.

Figure 5A:
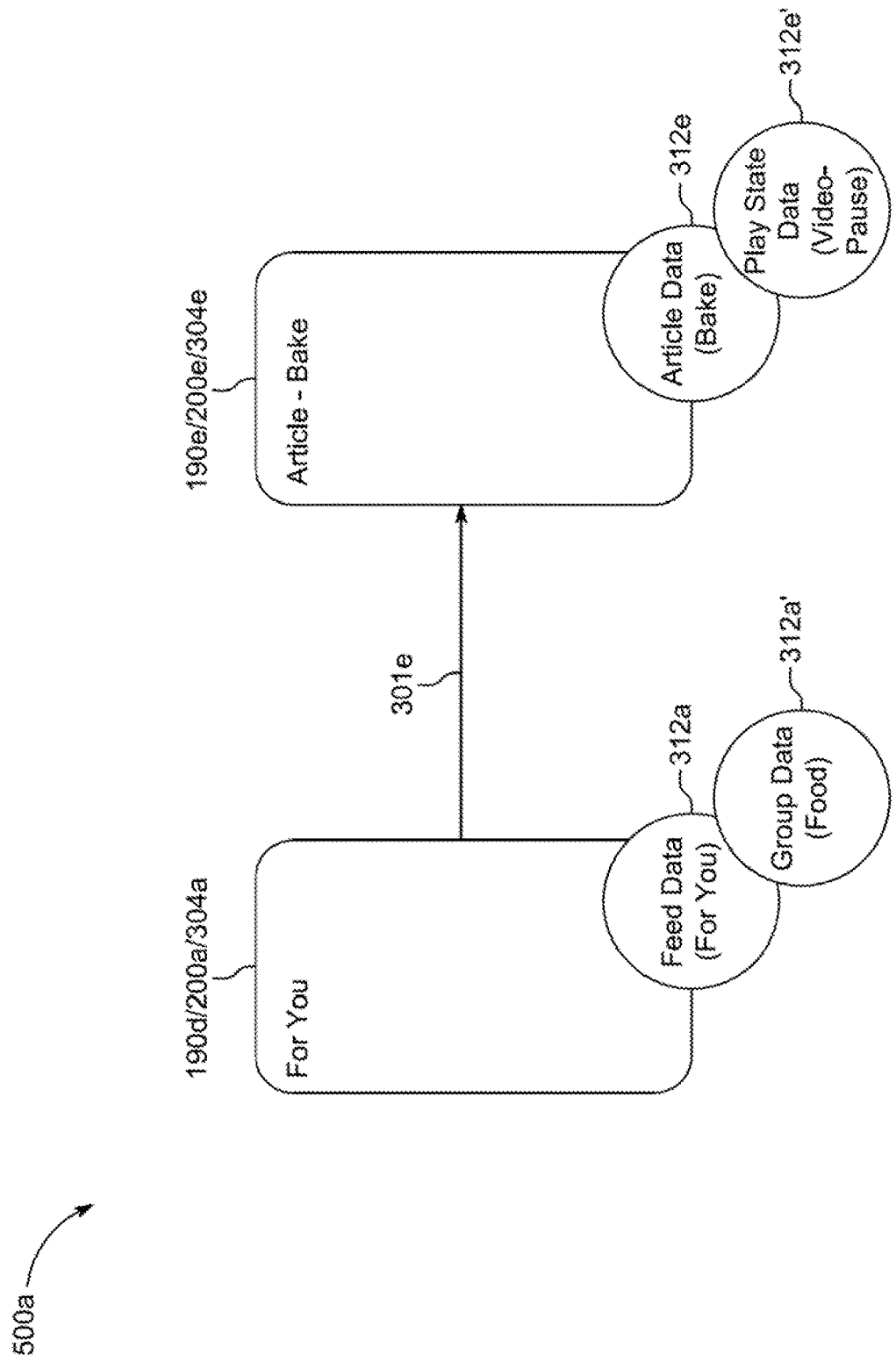
FIG. 5A is an exemplary schematic diagram of an application of one or more of FIGS. 1-3 as navigated in a second particular manner.
Figure 5B:
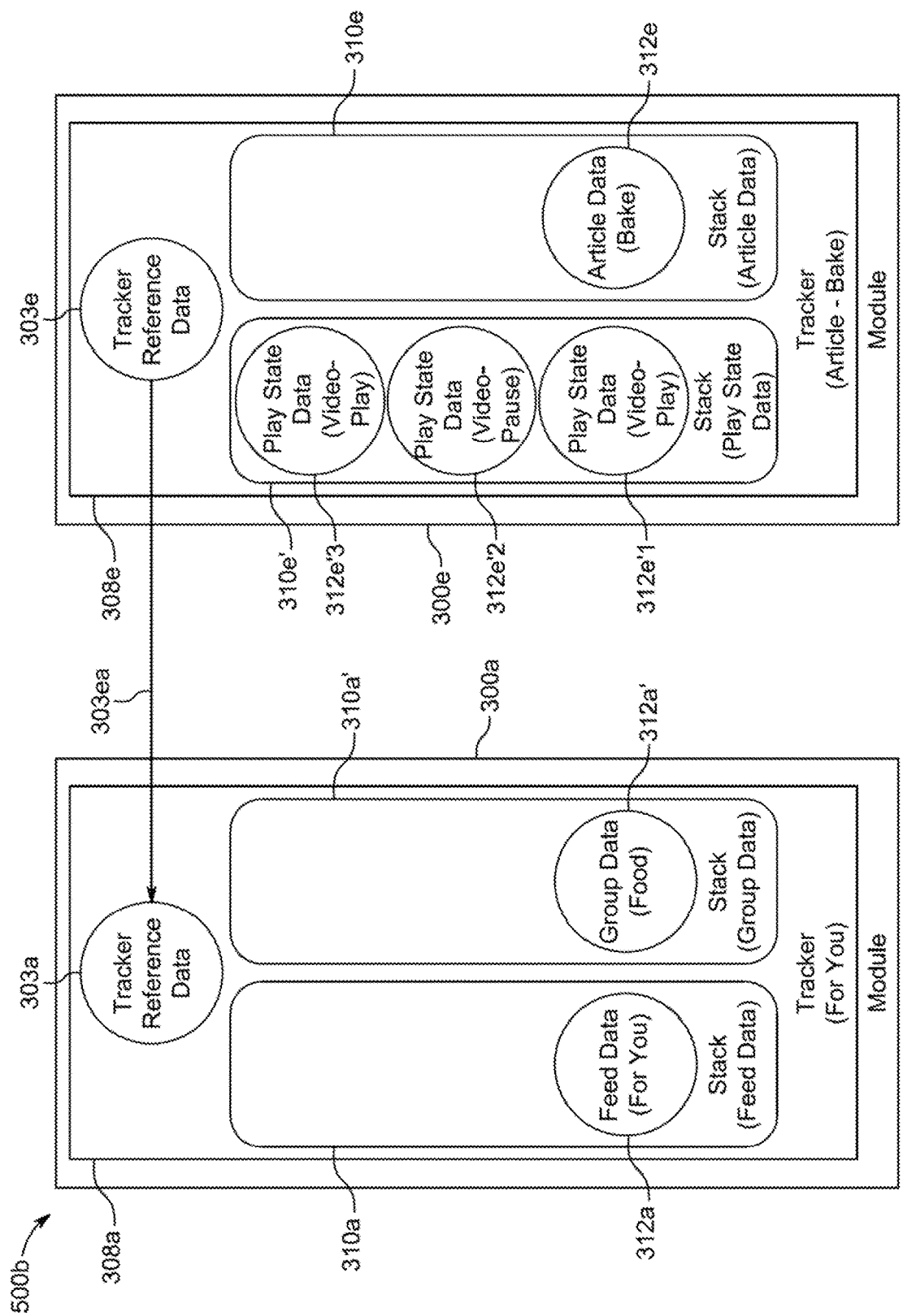
FIG. 5B is a more detailed exemplary schematic diagram of the application of FIG. 5A as navigated in the second particular manner.

When a particular navigation event is detected by module 300a (e.g., by controller 306a) for navigating from view 304a to view 304e (e.g., when user selection of news article link 203e of high-level news recommendation feed 200a is detected), module 300a may be operative to utilize a navigation route 301e of application 105 for navigating from view 304a of module 300a to view 304e of module 300e (e.g., router 302a of module 300a may be operative to load module 300e as a child of module 300a). Such navigation to a new module may also include storage of tracker reference data in the new module that may be operative to reference back to the tracker of the previous module. For example, in response to detecting a navigation event for navigating from view 304a to view 304e utilizing navigation route 301e, module 300a may be operative not only to initiate the loading of new module 300e, but module 300a may also be operative to store tracker reference data 303e in tracker 308e of module 300e, which may later be used by module 300e for identifying module 300a during collection of analytic data for an analytic event (e.g., for identifying module 300a as a parent of module 300e (e.g., for identifying tracker 308a as a parent of tracker 308e)). Moreover, when view 304a is initially presented by module 300a (e.g., as high-level news recommendation feed 200a of screen 190d via any suitable output component circuitry 110), at any other suitable time during presentation of view 304a, and/or in response to detecting a navigation event for navigating away from the presentation of view 304a, module 300a may be operative to identify and store any suitable analytic data in one or more tracker stacks of tracker 308a. For example, as shown in FIGS. 5A and 5B, "For You" feed data 312a may be stored in a feed data stack 310a of a for you tracker 308a of module 300a, where any such analytic data may be of a particular application field data type associated with that stack (e.g., for you analytic feed data). For example, stack 310a may be associated with a unique identifier that is unique to a particular application field data type or particular type of analytic data (e.g., for you analytic feed data), and such a unique identifier may also be used by any suitable analytic event (e.g., as an analytic field data type) to indicate which type(s) of analytic data ought to be collected for that analytic event. For you analytic feed data 312a of stack 310a may be any suitable analytic data associated with the for you feed data of view 304a that may be pertinent to the navigation from view 304a to view 304e, including, but not limited to, identification of news article link 204e (e.g., the link associated with the "Bake" article) that was selected by the navigation event at high-level news recommendation feed 200a, the location (e.g., position) of that selected article link within the list of links of view 304a, identification of feed 200a, the time at which view 304a was initially presented, the time at which the navigation event away from view 304a was detected, the total duration of time during which view 304a was presented, the time and type of any user input interaction(s) detected during presentation of view 304a (e.g., any scrolling events between screen 190a and screen 190d of view 304a), and/or the like that may be useful for analyzing user interaction with application 105 for a particular analytic event. Additionally, because the navigation event away from the presentation of high-level news recommendation feed 200a of view 304a was the selection of an article in a group rather than selection of a group, "Food" group analytic data 312a' may be stored in a group data stack 310a' of for you tracker 308a of module 300a, where any such analytic data may be of a particular application field data type associated with that stack (e.g., group analytic data). For example, stack 310a' may be associated with a unique identifier that is unique to a particular application field data type or particular type of analytic data (e.g., group analytic data), and such a unique identifier may also be used by any suitable analytic event (e.g., as an analytic field data type) to indicate which type(s) of analytic data ought to be collected for that analytic event. For you group analytic data 312a' of stack 310a' may be any suitable analytic data associated with the group of view 304a that may be pertinent to the navigation from view 304a to view 304e, including, but not limited to, identification of "food" group link 203e (e.g., the link associated with the "Food" group within which the selected article link 204e was presented), and/or the like that may be useful for analyzing user interaction with application 105 for a particular analytic event.

When a particular navigation event is detected by module 300e (e.g., by controller 306e) for navigating away from view 304e (e.g., to another view of another article or back to the feed of view 304a or any other suitable navigation event (e.g., closing of application 105 altogether)), module 300e may be operative to utilize a suitable navigation route of application 105 for navigating from view 304e of module 300e to that other view. Such navigation to another module may also include storage of tracker reference data in the other module that may be operative to reference back to the tracker of the previous module. For example, in response to detecting a navigation event for navigating from view 304e to another view, module 300e may be operative not only to initiate the loading of that other module, but module 300e may also be operative to store tracker reference data in a tracker of that other module, which may later be used by that other module for identifying module 300e during collection of analytic data for an analytic event (e.g., for identifying module 300e as a parent of that other module (e.g., for identifying tracker 308e as a parent of the tracker of that other module)). Moreover, when view 304e is initially presented by module 300e (e.g., as bake article 200e of screen 190e via any suitable output component circuitry 110), at any other suitable time during presentation of view 304e, and/or in response to detecting a navigation event for navigating away from the presentation of view 304e, module 300e may be operative to identify and store any suitable analytic data in one or more tracker stacks of tracker 308e. For example, as shown in FIGS. 5A and 5B, "Bake" article data 312e may be stored in an article data stack 310e of an article data tracker 308e of module 300e, where any such analytic data may be of a particular application field data type associated with that stack (e.g., article analytic data). For example, stack 310e may be associated with a unique identifier that is unique to a particular application field data type or particular type of analytic data (e.g., article analytic data), and such a unique identifier may also be used by any suitable analytic event (e.g., as an analytic field data type) to indicate which type(s) of analytic data ought to be collected for that analytic event. Article analytic data 312e of stack 310e may be any suitable analytic data associated with the bake article data of view 304e that may be pertinent to the navigation from view 304e to another view, including, but not limited to, identification of article 200e, the time at which view 304e was initially presented, the time at which the navigation event away from view 304e was detected, the total duration of time during which view 304e was presented, the time and type of any user input interaction(s) detected during presentation of view 304e (e.g., any scrolling events), and/or the like that may be useful for analyzing user interaction with application 105 for a particular analytic event. As another example, as shown in FIGS. 5A and 5B, one or more "play state" data objects $312e'1$, $312e'2$, and/or $312e'3$ may be stored in a play state data stack $310e'$ of article data tracker 308e of module 300e, where any such play state analytic data may be of a particular application field data type associated with that stack (e.g., play state analytic data). For example, stack $310e'$ may be associated with a unique identifier that is unique to a particular application field data type or particular type of analytic data (e.g., play state analytic data), and such a unique identifier may also be used by any suitable analytic event (e.g., as an analytic field data type) to indicate which type(s) of analytic data ought to be collected for that analytic event. One or more of play state analytic data $312e'1$, $312e'2$, and/or $312e'3$ of stack $310e'$ may be any suitable analytic data associated with the play state of video 203ev of view 304e that may be pertinent to the navigation from view 304e to another view, including, but not limited to, identification of video 203ev, the time at which video 203ev was initially played (or paused), the total duration of time during which video 203ev was played (or paused), the time and type of any user input interaction(s) detected while video 203ev was played (or paused) (e.g., any scrolling events), and/or the like that may be useful for analyzing user interaction with application 105 for a particular analytic event. As shown, multiple different play state analytic data objects $312e'1$, $312e'2$, and $312e'3$ may be stored in stack $310e'$ based on the presentation of view 304e. For example, video 203ev may be played, paused, and then played again while view 304e is presented to a user, whereby play state analytic data $312e'1$ may first be stored in association with the first play back, play state analytic data $312e'2$ may then be stored in association with the first pause, and play state analytic data $312e'3$ may then be stored in association with the second play back.

A navigation event that terminates a presentation of a particular article may also be defined to be an analytic event that may result in certain analytic data being collected for defining analytics payload data 57 for the presentation of that article, where such analytics payload data 57 may then be used to analyze the user's interaction with that article and navigation to that article. For example, when an event is detected by module 300e for navigating away from the presentation of the bake news article of view 304e, that event may be determined to be an analytic event, and such an analytic event may be determined to be associated with one or more particular analytic field data types. For example, an analytic event for navigation from a presented news article may be defined to be associated with one or more required analytic field data types and/or one or more optional analytic field data types. As a particular example, an analytic event for a presented news article of news application 105 may require collection of analytic data of any suitable required analytic field data types, including, but not limited to, article analytic data and feed analytic data, while such an analytic event for a presented news article of news application 105 may optionally accept collection of analytic data of any suitable optional analytic field data types, including, but not limited to, group analytic data and play state analytic data. Continuing with the example navigation of FIGS. 2D, 2E, 5A, and 5B, in which an analytic event requesting analytic field data types of article analytic data, play state analytic data, feed analytic data, and group analytic data may be detected for terminating presentation of view 304e of module 300e, device 100 may be configured to identify each analytic field data type associated with that analytic event, and then obtain from tracker 308e of current module 300e at least one analytic data object from each stack of tracker 308e that is associated with an application field data type that matches an analytic field data type of the analytic event. In such an example, module 300e may be operative to determine that the application field data type associated with stack 310e (e.g., article analytic data type) matches an analytic field data type associated with the detected analytic event (e.g., article analytic data type) and may then collect at least one data object from that stack 310e (e.g., article analytic data 312e of stack 310e) for defining at least a portion of analytics payload data 57 for the analytic event. In some embodiments, only the data object most recently stored in a stack may be collected when the field data type of that stack is determined to match a field data type of an analytic event. In other embodiments, each data object stored in a stack may be collected when the field data type of that stack is determined to match a field data type of an analytic event. Moreover, in such an example, module 300e may be operative to determine that the application field data type associated with stack 310e' (e.g., play state analytic data type) matches an analytic field data type associated with the detected analytic event (e.g., play state analytic data type) and may then collect at least one data object from that stack 310e' (e.g., play state analytic data 312e'3 of stack 310e (if not also play state analytic data 312e'2 and/or play state analytic data 312e'1) for defining an other portion of analytics payload data 57 for the analytic event.

When a current module is determined not to include a stack associated with a field data type of an analytic event, then the parent module of the current module may be identified and examined to determine if the parent module includes a stack associated with that currently unfulfilled field data type of the analytic event. Continuing with the example in which an analytic event requests analytic field data types of article analytic data, play state analytic data, group analytic data, and feed analytic data may be detected for terminating presentation of view 304e of module 300e, after at least one data object from stacks 310e of tracker 308e of module 300e may be collected for at least partially defining analytics payload data 57 for the analytic event due to the article analytic field data type of stack 310e being determined to match the article analytic field data type of the analytic event and after at least one data object from stacks 310e' of tracker 308e of module 300e may be collected for at least partially defining analytics payload data 57 for the analytic event due to the play state analytic field data type of stack 310e' being determined to match the play state analytic field data type of the analytic event, it may be determined that tracker 308e does not include any stack with a field data type that matches the feed analytic data type of the analytic event and/or that tracker 308e does not include any stack with a field data type that matches the group analytic data type of the analytic event. In response to such a determination, a parent module of module 300e may be identified in order to determine if that parent module includes any stack with a field data type that matches the feed analytic data type of the analytic event and/or any stack with a field data type that matches the group analytic data type of the analytic event. For example, tracker reference data 303e of module 300e may be used to identify module 300a as the parent module of module 300e and then the system may walk back through the tracker chain (e.g., along a path 303ea) from tracker 308e of module 300e to tracker 308a of parent module 300a to determine whether that parent tracker 308a includes a stack associated with an as of yet unfulfilled field data type of the analytic event (e.g., a feed analytic data type and/or a group analytic data type). Indeed, as shown, it may be determined that the field data type of stack 310a may match the unfulfilled feed field data type of the analytic event. In such an example, it may be determined that the application field data type associated with stack 310a (e.g., feed analytic data type) matches an as of yet unfulfilled analytic field data type associated with the detected analytic event (e.g., feed analytic data type) and may then collect at least one data object from that stack 310a (e.g., feed analytic data 312a of stack 310a) for defining another portion of analytics payload data 57 for the analytic event. In some embodiments, only the data object most recently stored in a stack may be collected when the field data type of that stack is determined to match a field data type of an analytic event. In other embodiments, each data object stored in a stack may be collected when the field data type of that stack is determined to match a field data type of an analytic event. Additionally, in such an example, it may be determined that the application field data type associated with stack 310a' (e.g., group analytic data type) matches an as of yet unfulfilled analytic field data type associated with the detected analytic event (e.g., group analytic data type) and may then collect at least one data object from that stack 310a' (e.g., group analytic data 312a' of stack 310a') for defining another portion of analytics payload data 57 for the analytic event. Therefore, analytics payload data 57 may be defined to include collected article data 312e of stack 310e of tracker 308e of module 300e, at least collected play state data 312e'3 of stack 310e' of tracker 308e of module 300e, collected feed data 312a of stack 310a of tracker 308a of module 300a, and collected group data 312a' of stack 310a' of tracker 308a of module 300a.

Once analytic data has been obtained from an initially identified stack for each field data type of an analytic event while, if necessary, tracking backwards the application navigation from the module that detected the analytic event, no more analytic data may need to be collected from any other stacks. For example, continuing with the example in which an analytic event requiring analytic field data types of article analytic data, play state analytic data, feed analytic data, and group analytic data may be detected for terminating presentation of view 304e of module 300e, after at least one data object from each one of stacks 310e, 310e', 310a, and 310a' may be collected for at least partially defining analytics payload data 57 for the analytic event due to the analytic field data type of each stack being determined to match an analytic field data types of the analytic event, then the system may determine that no additional analytic field data needs to be collected. For example, the system may be configured not to bother tracking back further to a parent of module 300a (e.g., to root module 300r) in order to obtain any additional analytic field data from module 300r as each analytic field data type request of the analytic event has already been fulfilled by modules 300e and 300a. This may reduce the size of analytics payload data 57 and/or the amount of data that must be collected or maintained in the system and/or the amount of time required to collect the analytics payload data. Alternatively, in other embodiments, all data available to all stacks from all modules in a navigation path may be collected for a particular analytic event. Moreover, in some embodiments, in addition to collecting at least one data object from at least one stack that matches each field data type of the analytic event for defining analytics payload data 57 for the analytic event, navigation path data may also be included as a portion of analytics payload data 57. For example, even if all of the field data types of the analytic event have been satisfied by stacks 310e, 310e', 310a, and 310a', the full navigation path within application 105 for arriving at article 200e of view 304e that triggered the analytic event may be determined and included as a portion of analytics payload data 57 for that analytic event. In such embodiments, tracker reference data 303a of module 300a may be used to identify module 300r as the parent module of module 300a and then the system may walk back through the tracker chain from tracker 308a of module 300a to tracker 308r of parent module 300r to enable definition of the full navigation path within application 105 (e.g., from module 300r to module 300a to module 300e) and information indicative of that path may be included in the definition of analytics payload data 57 along with data 312e, 312e'3, 312a, and 312a'.

Therefore, the data and the event may be tracked separately as they are indeed separate things. The data may represent the state of the content and the event may represent the user interaction that may trigger capturing the state of the content. The state of the content may be spread out across several layers of the application but the event for an article analytic event may occur in one place (e.g., the article view controller of the article module). Therefore, the processes of this disclosure enable data to be tracked via data stacks (e.g., push/pop) independently of submitting an analytic event. This may allow the system to do the hard work of populating the events with data based on the state of the system. An event may have any suitable syntax. For example, an event may be provided as follows:

```
struct ArticleHostViewExposure {
    let article: ArticleData
    let feedData: FeedData
    // notice the group data and the play state data is optional
    let groupData: GroupData?
    let playstateData: PlayStateData?
}
```

Therefore, the analytic event may require article data and feed data, but group data may be optional because it may only be part of an application state when viewing an article in the direct from for you navigation flow of FIGS. 2D, 2E, 5A, and 5B, and, similarly, play state data may be optional because it may only be part of an application state when viewing an article with a certain type of media (e.g., a movie or audio clip, such as in the article of FIGS. 2E, 5A, and 5B). The navigation flow of FIGS. 2D, 2E, 5A, and 5B may be provided as follows:

```
let feedData = FeedData(feedName: "ForYou")
tracker.push(feedData)
// user taps on article in feed
let groupData = GroupData(groupName: "Food")
tracker.push(groupData)
// pushing new view controller on the stack for article
let articleData = ArticleData(articleID: "Bake")
tracker.push(articleData)
let playstateData = PlayStateData(playstateName: "Play")
tracker.push(playstateData)
```

As shown by diagram 500b in FIG. 5B, each type of data may be held in its own stack so each data object type can be pushed and popped freely without interfering with the other stacks. Then, an analytic event may be submitted as follows:
tracker.submit(ArticleHostViewExposure.self)
The only thing that may be relevant with respect to the analytic event user interaction point is the event that may be sent. Based on the above definition of the ArticleHostViewExposure, the system may gather the state of the application to capture the context of the event, and an event submission may generate the following JavaScript Object Notation ("JSON"):

```
{
    "article": {
        "articleID": "Bake"
    },
    "feed": {
        "feedName": "ForYou"
    },
    "group": {
        "groupName": "Food"
    },
    "playstate": {
        "playstateName": "Play"
    }
}
```

These events may be serialized into a flat structure as long as properties across data models were unique. However, proper nesting of data may also be carried out. The system may be operative to reflect the ArticleHostViewExposure event and determine that it requires ArticleData and FeedData and can contain GroupData. The system may then look at the top of all of the data stacks for each type of stack (e.g., the most recently populated stack of each type) to gather that information. On the other hand, the navigation flow of FIGS. 2A, 2B, 2C, 4A, and 4B may be provided as follows:

```
let feedData = FeedData(feedName: "ForYou")
tracker.push(feedData)
// user taps on group footer to navigate to feed
// push new feed view controller onto the stack
let feedData2 = FeedData(feedName: "Movies")
tracker.push(feedData2)
// user taps on article in feed
// pushing new view controller on the stack for article
let articleData = ArticleData(articleID: "Actor")
tracker.push(articleData)
```

As shown in diagram 400b of FIG. 4B, a completely decoupled and accurate representation of the application state may be provided. Then, a similar analytic event may be submitted as follows:

tracker.submit(ArticleHostViewExposure.self).
and such an event submission may produce the following JSON:

```
{
    "article": {
        "articleID": "Actor"
    },
    "feed": {
        "feedName": "Movies"
    }
}
```

This may be achieved by looking at the top of each data stack of a particular type (e.g., the most recently populated stack of each type associated with the analytic event (e.g., stack 310b but not stack 310a as stack 310b was populated more recently than (e.g., after) stack 310a)), such that the system will consume the "Movie" feed data and, as there is no group data, group data will not be included in the payload. The data captured in an event is decoupled from the submission point of the event.

Figure 6:
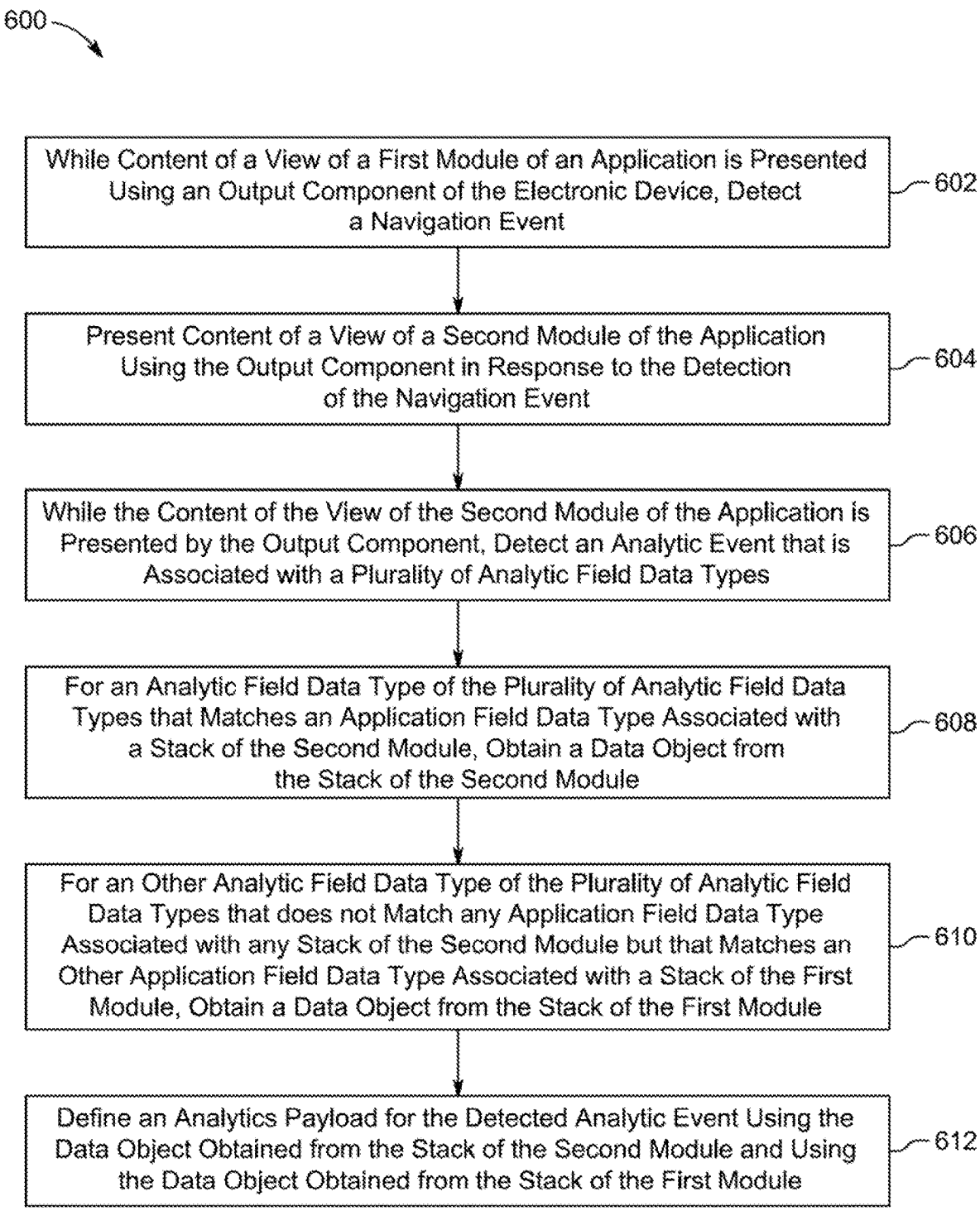
FIG. 6 is a flowchart of an illustrative process for collecting analytic data for application navigation.

FIG. 6 is a flowchart of an illustrative process 600 for operating electronic device 100 for collecting analytic data for navigation of an application on device 100 (e.g., navigation of application 105). Process 600 may include decoupling y identity is the same as the other entity identity. A majority or the entirety of process 600 may be carried out by decoupling at least a portion of data capture from the submission point of an analytic event, which, for example, may reduce the data storage and/or data transmission burden amongst distinct modules, thereby creating a more efficient and effective analytic process.

At operation 602 of process 600, while content of a view of a first module of an application is presented using an output component of the electronic device, a navigation event may be detected. For example, with respect to the example of FIGS. 2A-2C. 4A, and 4B, while an output component of device 100 may present screen 190b of content of FIG. 2B that may provide group-level news recommendation feed 200b of view 304b of module 300b of application 105, a navigation event that may include a user selecting news article link 205b of group-level news recommendation feed 200b may be detected (e.g., by controller 306b of module 300b). As another example, with respect to the example of FIGS. 2D, 2E, 5A, and 5B, while an output component of device 100 may present screen 190d of content of FIG. 2D that may provide high-level news recommendation feed 200a of view 304a of module 300a of application 105, a navigation event that may include a user selecting news article link 204e of high-level news recommendation feed 200a may be detected (e.g., by controller 306a of module 300a). At operation 604 of process 600, in response to detecting the navigation event at operation 602, content of a view of a second module of the application may be presented using the output component. For example, with respect to the example of FIGS. 2A-2C, 4A, and 4B, in response to detecting a user selecting news article link 205b of group-level news recommendation feed 200b, the output component of device 100 may present screen 190c of content of FIG. 2C that may provide actor article data 200c of view 304c of module 300c of application 105. As another example, with respect to the example of FIGS. 2D, 2E, 5A, and 5B, in response to detecting a user selecting news article link 204e of high-level news recommendation feed 200a, the output component of device 100 may present screen 190e of content of FIG. 2E that may provide bake article data 200e of view 304e of module 300e of application 105. At operation 606 of process 600, while content of the view of the second module of the application is presented using the output component of the electronic device, an analytic event may be detected that is associated with a plurality of analytic field data types. For example, with respect to the example of FIGS. 2A-2C, 4A, and 4B, while the output component of device 100 may present screen 190c of content of FIG. 2C that may provide actor article data 200c of view 304c of module 300c of application 105, an analytic event that may include a user selecting next article button 206c of data 200c of view 304c may be detected for navigating to a new news article (e.g., to news article 200e of FIG. 2E), where the analytic event may be associated with at least an article analytic field data type and a feed analytic field data type. As another example, with respect to the example of FIGS. 2D, 2E, 5A, and 5B, while the output component of device 100 may present screen 190e of content of FIG. 2E that may provide bake article data 200e of view 304e of module 300e of application 105, an analytic event that may include a user selecting next article button 206e of data 200e of view 304e may be detected for navigating to a new news article, where the analytic event may be associated with at least an article analytic field data type and a play state analytic field data type and a feed analytic field data type and a group analytic field data type. Next, at operation 608 of process 600, for an analytic field data type of the plurality of analytic field data types that matches an application field data type associated with a stack of the second module, a data object from the stack of the second module may be obtained. For example, with respect to the example of FIGS. 2A-2C, 4A, and 4B, for the article analytic field data type of the detected analytic event that matches an application field data type of article data stack 310c of tracker 308c of module 300c of the application, an article data object 312c may be obtained. As another example, with respect to the example of FIGS. 2D, 2E, 5A, and 5B, for the article analytic field data type of the detected analytic event that matches an application field data type of article data stack 310e of tracker 308e of module 300e of the application, an article data object 312e may be obtained and/or, for the play state analytic field data type of the detected analytic event that matches an application field data type of play state data stack 310e' of tracker 308e' of module 300e of the application, an article data object 312e'3 may be obtained. At operation 610 of process 600, for an other analytic field data type of the plurality of analytic field data types that does not match any application field data type associated with any stack of the second module but that matches an other application field data type associated with a stack of the first module, a data object from the stack of the first module may be obtained. For example, with respect to the example of FIGS. 2A-2C, 4A, and 4B, for the feed analytic field data type of the detected analytic event that matches an application field data type of feed data stack 310b of tracker 308b of module 300b of the application, a feed data object 312b may be obtained. As another example, with respect to the example of FIGS. 2D, 2E, 5A, and 5B, for the feed analytic field data type of the detected analytic event that matches an application field data type of feed data stack 310a of tracker 308a of module 300a of the application, a feed data object 312a may be obtained and/or, for the group analytic field data type of the detected analytic event that matches an application field data type of group data stack 310a' of tracker 308a' of module 300a of the application, a group data object 312a' may be obtained. Then, at operation 612 of process 600, an analytics payload for the detected analytic event may be defined using the data object obtained from the stack of the second module and using the data object obtained from the stack of the first module. For example, with respect to the example of FIGS. 2A-2C, 4A, and 4B, analytics payload data 57 for the detected analytic event may be defined to include article data 312*c* from stack 310*c* of tracker 308*c* of module 300*c* and feed data 312*b* from stack 310*b* of tracker 308*b* of module 300*b*. As another example, with respect to the example of FIGS. 2D, 2E, 5A, and 5B, analytics payload data 57 for the detected analytic event may be defined to include article data 312*e* from stack 310*e* of tracker 308*e* of module 300*e* and/or play state data 312*e*'3 from stack 310*e*' of tracker 308*e* of module 300*e* and feed data 312*a* from stack 310*a* of tracker 308*a* of module 300*a* and/or group data 312*a*' from stack 310*a*' of tracker 308*a*' of module 300*a*'. In some embodiments, the collection of data (e.g., pushing data onto a stack and/or collecting) may be the responsibility of and/or carried out by the application. An analytics framework may be responsible for gathering tracked data (e.g., to generate a payload that can be submitted to a server). An event definition may state what data should be collected when generating a payload (e.g., what type of data and whether it is required/optional). Then, when that event is submitted to the analytic system, the system can reflect the event and generate the payload based on the data that has been pushed into the system.

It is understood that the operations shown in process 600 of FIG. 6 are only illustrative and that existing operations may be modified or omitted, additional operations may be added, and the order of certain operations may be altered.

It is to be understood that, although many of the examples described herein are directed to a news application and the various hierarchical navigation views thereof, the processes described herein may be utilized by any suitable application, including, but not limited to, a stock application that may recommend stocks and/or links about stocks, a books application that may recommend books, a movies application that may recommend movies, or any other suitable application. A process may fire an analytic event upstream and then track back downstream the navigation path to collect requested analytic payload data. The different modules (e.g., modules 300*a*, 300*b*, 300*c*, 300*d*, and 300*e*) may be distinct from one another and may not independently store the same analytic data. The data captured in an event may be decoupled from the submission point of the event. Tracker chaining may be used to accomplish this decoupling of data tracking and event submission, which allows a navigational hierarchy to be created that matches the application state. When events are submitted, the tracker chain may be walked back to collect the data required for the event. Each tracker may be configured as a chainable object that tracks data through the system (e.g., each view may create its own tracker in response to a parent instructing it to do so, and each tracker can walk back to its parent, even if the parent is not able to later track forward to the child). Therefore, stored analytic data objects need not be forwarded upstream during navigation of an application hierarchy (e.g., from a high-level feed to a group-level feed to an article (e.g., when the article is initially opened)), but instead may be recalled by walking back downstream in response to detecting an analytic event (e.g., after navigating away from a previously opened article). This may provide a much more efficient and effective operation of an electronic device running such an application.

As described above, one aspect of the present technology is the collection and use of analytic data available from various specific and legitimate sources to navigate an application. The present disclosure contemplates that in some instances, this gathered data may include personal information data that uniquely identifies or can be used to identify a specific person or actions thereof. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Moreover, one, some, or all of the processes described with respect to FIGS. 1-6 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications circuitry 114 (e.g., as at least a portion of application 103 and/or application 105)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module may be provided as a software construct, firmware construct, one or more hardware components, or a combination thereof. For example, any or each module may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules are only illustrative, and that the number, configuration, functionality, and interconnection of existing modules may be modified or omitted, additional modules may be added, and the interconnection of certain modules may be altered.

At least a portion of one or more of the modules may be stored in or otherwise accessible to device 100 in any suitable manner (e.g., in memory 104 of device 100 (e.g., as at least a portion of application 103 and/or application 105)) and/or to server 50. Any or each module may be implemented using any suitable technologies (e.g., as one or more integrated circuit devices), and different modules may or may not be identical in structure, capabilities, and operation. Any or all of the modules or other components may be mounted on an expansion card, mounted directly on a system motherboard, or integrated into a system chipset component (e.g., into a "north bridge" chip).

Any or each module may be a dedicated system implemented using one or more expansion cards adapted for various bus standards. For example, all of the modules may be mounted on different interconnected expansion cards or all of the modules may be mounted on one expansion card. By way of example only, the modules may interface with a motherboard or processor 102 of device 100 through an expansion slot (e.g., a peripheral component interconnect ("PCI") slot or a PCI express slot). Alternatively, the system may include one or more dedicated modules that may include memory (e.g., RAM) dedicated to the utilization of the module. A module may utilize a portion of device memory 104 of device 100. Any or each module may include its own processing circuitry and/or memory. Alternatively, any or each module may share processing circuitry and/or memory with any other module and/or processor 102 and/or memory 104 of device 100. Alternatively, any or each module may share processing circuitry and/or memory of server 50 remote from device 100.

While there have been described systems, methods, and computer-readable media for collecting analytic data for application navigation with an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for providing analytic data associated with a navigation of an application on a computing device, the method comprising, at the computing device:
    detecting a navigation event while displaying a first module of the application;
    displaying a second module of the application in response to the navigation event;
    detecting an analytic event while displaying the second module of the application, wherein the analytic event is associated with a plurality of analytic data types;
    obtaining, for at least one analytic data type of the plurality of analytic data types that matches a respective second application data type associated with the second module, a respective second data object from the second module;
    obtaining, for at least one remaining analytic data type of the plurality of analytic data types that matches a respective first application data type associated with the first module, a respective first data object from the first module; and
    generating an analytics payload for the analytic event using the respective first and second data objects.

2. The method of claim 1, wherein the navigation event comprises transitioning from a first information feed of the application to a second information feed of the application.

3. The method of claim 2, wherein the navigation event is triggered when a user selects a link that causes the application to transition from the first information feed to the second information feed.

4. The method of claim 1, wherein the respective first and second data objects are obtained in response to detecting the analytic event.

5. The method of claim 1, wherein one or more of the respective first and second application data types and the plurality of analytic data types comprises one or more of a news article analytic data type, a news feed analytic data type, a news group analytic data type, and a play state analytic data type.

6. The method of claim 1, wherein:
    the respective first data object includes information that is pertinent to a first interaction with the first module by a user; and
    the respective second data object includes information that is pertinent to the navigation event and a second interaction with the second module by the user.

7. The method of claim 1, wherein one or more of the respective first and second data objects includes one or more of:
    an indication of a link that, when selected, causes the navigation event;
    a location of the link within the first module;
    a first time at which the first module was displayed;
    a second time at which the second module was displayed;
    times and types of navigation events associated with interactions with one or more of the first and second modules by a user; and
    play state information associated with at least one media content displayed within or more of the first and second modules.

8. A non-transitory computer readable storage medium configured to store instructions that, when executed by a processor included in a computing device, cause the computing device to provide analytic data associated with a navigation of an application on the computing device, by carrying out steps that include:
- detecting a navigation event while displaying a first module of the application;
- displaying a second module of the application in response to the navigation event;
- detecting an analytic event while displaying the second module of the application, wherein the analytic event is associated with a plurality of analytic data types;
- obtaining, for at least one analytic data type of the plurality of analytic data types that matches a respective second application data type associated with the second module, a respective second data object from the second module;
- obtaining, for at least one remaining analytic data type of the plurality of analytic data types that matches a respective first application data type associated with the first module, a respective first data object from the first module; and
- generating an analytics payload for the analytic event using the respective first and second data objects.

9. The non-transitory computer readable storage medium of claim 8, wherein the navigation event comprises transitioning from a first information feed of the application to a second information feed of the application.

10. The non-transitory computer readable storage medium of claim 9, wherein the navigation event is triggered when a user selects a link that causes the application to transition from the first information feed to the second information feed.

11. The non-transitory computer readable storage medium of claim 8, wherein the respective first and second data objects are obtained in response to detecting the analytic event.

12. The non-transitory computer readable storage medium of claim 8, wherein one or more of the respective first and second application data types and the plurality of analytic data types comprises one or more of a news article analytic data type, a news feed analytic data type, a news group analytic data type, and a play state analytic data type.

13. The non-transitory computer readable storage medium of claim 8, wherein:
- the respective first data object includes information that is pertinent to a first interaction with the first module by a user; and
- the respective second data object includes information that is pertinent to the navigation event and a second interaction with the second module by the user.

14. The non-transitory computer readable storage medium of claim 8, wherein one or more of the respective first and second data objects includes one or more of:
- an indication of a link that, when selected, causes the navigation event;
- a location of the link within the first module;
- a first time at which the first module was displayed;
- a second time at which the second module was displayed;
- times and types of navigation events associated with interactions with one or more of the first and second modules by a user; and
- play state information associated with at least one media content displayed within or more of the first and second modules.

15. A computing device configured to provide analytic data associated with a navigation of an application on the computing device, the computing device comprising a processor configured to cause the computing device to carry out steps that include:
- detecting a navigation event while displaying a first module of the application;
- displaying a second module of the application in response to the navigation event;
- detecting an analytic event while displaying the second module of the application, wherein the analytic event is associated with a plurality of analytic data types;
- obtaining, for at least one analytic data type of the plurality of analytic data types that matches a respective second application data type associated with the second module, a respective second data object from the second module;
- obtaining, for at least one remaining analytic data type of the plurality of analytic data types that matches a respective first application data type associated with the first module, a respective first data object from the first module; and
- generating an analytics payload for the analytic event using the respective first and second data objects.

16. The computing device of claim 15, wherein the navigation event comprises transitioning from a first information feed of the application to a second information feed of the application.

17. The computing device of claim 16, wherein the navigation event is triggered when a user selects a link that causes the application to transition from the first information feed to the second information feed.

18. The computing device of claim 15, wherein the respective first and second data objects are obtained in response to detecting the analytic event.

19. The computing device of claim 15, wherein one or more of the respective first and second application data types and the plurality of analytic data types comprises one or more of a news article analytic data type, a news feed analytic data type, a news group analytic data type, and a play state analytic data type.

20. The computing device of claim 15, wherein one or more of the respective first and second data objects includes one or more of:
- an indication of a link that, when selected, causes the navigation event;
- a location of the link within the first module;
- a first time at which the first module was displayed;
- a second time at which the second module was displayed;
- times and types of navigation events associated with interactions with one or more of the first and second modules by a user; and
- play state information associated with at least one media content displayed within or more of the first and second modules.

* * * * *